(12) United States Patent
Luo et al.

(10) Patent No.: US 12,464,415 B2
(45) Date of Patent: Nov. 4, 2025

(54) SYSTEM AND METHOD FOR IAB HANDOVERS

(71) Applicant: ZTE CORPORATION, Guangdong (CN)

(72) Inventors: Wei Luo, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 380 days.

(21) Appl. No.: 17/482,933

(22) Filed: Sep. 23, 2021

(65) Prior Publication Data

US 2022/0014976 A1  Jan. 13, 2022

Related U.S. Application Data

(63) Continuation of application No. PCT/CN2019/080247, filed on Mar. 28, 2019.

(51) Int. Cl.
*H04W 36/00* (2009.01)
*H04W 36/12* (2009.01)

(52) U.S. Cl.
CPC ... *H04W 36/0044* (2013.01); *H04W 36/0064* (2023.05); *H04W 36/12* (2013.01)

(58) Field of Classification Search
CPC ............. H04W 36/0044; H04W 36/12; H04W 36/0064; H04W 84/047; H04W 88/085; H04W 36/0033; H04W 36/26; H04W 40/248; H04W 40/36
See application file for complete search history.

(56) References Cited

U.S. PATENT DOCUMENTS

| | | | |
|---|---|---|---|
| 2010/0113010 A1* | 5/2010 | Tenny | H04L 47/10 455/437 |
| 2014/0254523 A1* | 9/2014 | Chai | H04W 76/14 370/329 |
| 2019/0069333 A1* | 2/2019 | Kim | H04W 36/0033 |
| 2019/0182716 A1* | 6/2019 | Futaki | H04W 76/10 |
| 2019/0215726 A1* | 7/2019 | Park | H04W 16/18 |
| 2020/0344843 A1* | 10/2020 | Zhu | H04W 40/22 |
| 2020/0383164 A1* | 12/2020 | Kim | H04W 76/12 |
| 2021/0092725 A1* | 3/2021 | Park | H04W 76/27 |
| 2021/0153220 A1 | 5/2021 | Dai et al. | |
| 2021/0204281 A1* | 7/2021 | Wu | H04W 72/29 |

(Continued)

FOREIGN PATENT DOCUMENTS

| | | |
|---|---|---|
| CN | 107027153 A | 8/2017 |
| CN | 108541032 A | 9/2018 |
| CN | 108811153 A | 11/2018 |

OTHER PUBLICATIONS

First Office Action for CN Appl. No. 201980096882.7, Dated Nov. 21, 2022 (with English translation, 29 pages).

(Continued)

*Primary Examiner* — Hashim S Bhatti
(74) *Attorney, Agent, or Firm* — Foley & Lardner LLP

(57) ABSTRACT

Systems and methods for a handover (HO) for a migrating node are disclosed herein. In one embodiment, the system and method are configured to send, by a central unit (CU) to a target distributed unit (DU), a user equipment (UE) context setup request configured to create a UE context and to set up at least one bearer, and receiving, by the CU from the target DU, a UE context setup response responsive to the UE context setup request.

13 Claims, 13 Drawing Sheets

(56) References Cited

U.S. PATENT DOCUMENTS

| | | | |
|---|---|---|---|
| 2021/0227435 A1* | 7/2021 | Hsieh | H04W 36/087 |
| 2022/0086935 A1* | 3/2022 | Byun | H04W 74/0833 |
| 2023/0328596 A1* | 10/2023 | Qiao | H04W 36/0011 370/330 |

OTHER PUBLICATIONS

Huawei et al., "UE Context Setup and UE Context Modification Requests Handling" 3GPP TSG-RAN WG3 Meeting #103, R3-190472, Mar. 1, 2019, Athens, Greece (78 pages).

3GPP, 3GPP Technical Specification Group Radio Access Network; NG-RAN; F1 application protocol (F1AP) (release 15), 3GPP TS 38.473, V15.4.1, Jan. 1, 2019 (192 pages).

3GPP, "3GPP Technical Specification Group Radio Access Network; NR; Study on Integrated Access and Backhaul (release 16)", 3GPP TR 38.874, V16.0.0, Dec. 1, 2018 (111 pages).

Extended European Search Report for EP Appl. No. 19920918.0, dated Mar. 23, 2022 (14 pages).

ZTE et al., "Discussion on backhaul bearer setup in IAB network" 3GPP TSG-RAN WG2 #104, R2-1817411, Nov. 16, 2018, Spokane, USA (6 pages).

Huawei et al.: "Adaptation layer design" 3GPP TSG-RAN WG3 #Ad Hoc 1807; R3-183784; Jul. 6, 2018; Montreal, Canada (5 pages).

Huawei et al.: "IAB Node Integration Procedure" 3GPP TSG-RAN WG3 Meeting #103; R3-190407; Mar. 1, 2018; Athens (4 pages).

Huawei: "TP on Mobility procedures to 38.401" 3GPP TSG RAN WG3 Meeting #NR ADHoC; R3-172182; Jun. 29, 2017; Qingdao, China (2 pages).

International Search Report and Written Opinion on PCT/CN2019/080247 dated Dec. 27, 2019.

Qualcomm Inc. et al.: "IAB inter-CU Topology Adaptation for Arch 1a" 3GPP TSG-RAN WG3 Meeting #102; R3-186456; Nov. 16, 2018; Spokane, WA, USA (10 pages).

ZTE et el.: "Consideration on Routing in IAB" 3GPP TSG RAN WG3 NR#103; R3-190545; Mar. 1, 2019; Athens, Greece (6 pages).

Search Report and Written Opinion on Singapore Appln. No. 11202110656T, dated Feb. 24, 2023 (14 pages).

* cited by examiner

SYSTEM AND METHOD FOR IAB HANDOVERS

CROSS-REFERENCE TO RELATED APPLICATION

This application claims the benefit of priority under 35 U.S.C. § 120 as a continuation of PCT Patent Application No. PCT/CN2019/080247, filed on Mar. 28, 2019, the disclosure of which is incorporated herein by reference in its entirety

TECHNICAL FIELD

The disclosure relates generally to wireless communications and, more particularly, to systems and methods for handovers (HOs) of relay nodes.

BACKGROUND

A child relay node may become disconnected from a parent relay node during relay node handover due to poor network link conditions or channel crowding.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a method includes sending, by a central unit (CU) to a target distributed unit (DU), a user equipment (UE) context setup request configured to create a UE context and to set up at least one bearer and receiving, by the CU from the target DU, a UE context setup response responsive to the UE context setup request.

In some embodiments, a method includes sending, by a CU, a route reconfiguration request to each of downstream IAB nodes of the IAB node responsive to updates to a route table; and receiving, by the CU from each of the downstream IAB nodes, a route reconfiguration response.

In some embodiments, a method includes receiving, by an IAB node, routing information updates, and after the IAB node receiving a radio resource control (RRC) reconfiguration message notifying the IAB node, sending a HO indication or routing information update indication to at least one child IAB node of the IAB node.

In some embodiments, a method includes receiving, from a source CU by a target CU, a handover (HO) request and sending, to the source CU by the target CU, a HO request acknowledgement.

In some embodiments, a method includes sending, to a source CU a HO request, receiving a HO request acknowledgement, and sending, by the source CU, a radio resource control (RRC) reconfiguration message to a mobile terminal (MT) of the IAB node, which comprises an internet protocol (IP) address of the target CU.

In some embodiments, a method includes sending, to a source CU a HO request, receiving a HO request acknowledgement, and sending, by the source CU, a F1 application protocol (AP) message to a DU of the IAB which comprises internet protocol (IP) address of the target CU.

In some embodiments, a method includes receiving, by an integrated access backhaul (IAB) node, an adaptation layer information, wherein the adaptation layer information comprises at least a routing list and selecting, by the IAB node, routing based on the adaptation layer information.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Figure 1:
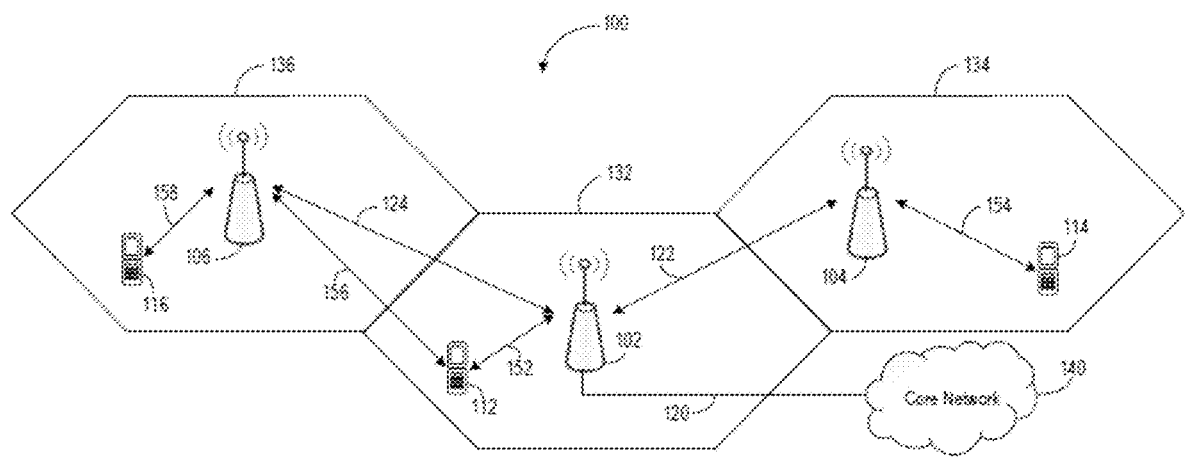
FIG. 1 illustrates an example IAB link network and/or system in which techniques and other aspects disclosed herein can be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A node configured for relay capabilities is referred to as a relay node (RN). A RN can provide user equipment (UE) within a serving cell of the RN with similar functions and services as those provided by a regular eNB. A wireless connection between a RN and a UE is referred to as an access link. An RN is configured to be wirelessly connected to an evolved node B (eNB) that serves the RN in a manner similar to the manner in which a regular UE is wirelessly connected to the eNB. An eNB that serves an RN is referred to as a donor eNB (DeNB). The wireless connection between the DeNB and the RN is referred to as a backhaul link.

To improve network capacity and coverage while considering the need for flexibility for serving cell deployment, the present disclosure provides improved wireless backhaul transmission for relay connection, referred to herein as integrated access and backhaul (IAB). IAB can be used to realize concentrated network deployment. Improvement in bandwidth and support for large-scale multi-antenna or multi-beam transmission provide support for realizing integrated access backhaul as described herein, where the backhaul link and access link share air resources. To further improve flexibility for deployment, ordinary IAB does not need to connect to the core network—only IAB donors need to connect to the core network. Thus, a regular IAB is configured to connect to the core network by transmitting data to an IAB donor.

As referred to herein, an IAB donor is gNB that provides functionality for IAB and supports new radio (NR) backhaul links to IAB-nodes. An IAB node is a radio access network (RAN) node that support access links to UEs and child nodes as well as NR backhaul links to parent nodes. A NR backhaul link is an NR link used for backhauling between an IAB node and an IAB donor, and between IAB nodes in case of a multi-hop backhauling. A parent node is a Northbound node of an IAB-node; the parent node can be IAB node or IAB donor distributed unit (DU). A child node is a southbound node of an IAB node; the child node is also an IAB node. Southbound or upstream refers to a direction in multi-hop backhauling away from the IAB donor. Northbound or downstream refers to a direction in multi-hop backhauling toward the IAB donor. Multi-hop backhauling refers to a chain of NR backhaul links between an IAB node and an IAB donor.

FIG. 1 illustrates an example IAB link network and/or system 100 in which techniques and other aspects disclosed herein can be implemented, in accordance with an embodiment of the present disclosure. In the following discussion, the IAB link network 100 can be any wireless network (such as but not limited to, a cellular network, a narrowband Internet of things (NB-IoT) network, and so on). Referring to FIG. 1, the IAB link network 100 includes various IAB nodes 102, 104, and 106, each of which provides communication service within a respective one of cells 132, 134, and 136. That is, each of the IAB nodes 102, 104, and 106 can be a base station (e.g., an eNB) operating at one or more allocated bandwidths for providing radio coverage to users (e.g., UEs 112, 114, and 116) located within a respective one of the cells 132, 134, and 136. For example, the UE 112 can communicate with the IAB node 102 via a communication link (e.g., an access link 152) and can communicate with the IAB node 106 via a communication link (e.g., an access link 156). The UE 114 can communicate with the IAB node 104 via a communication link (e.g., an access link 154). The UE 116 can communicate with the IAB node 106 via a communication link (e.g., an access link 158). The cells 132, 134, and 136 as well as other cells (not shown) can form a cluster of cells overlaying a given geographical area.

The IAB node 102 is connected to a core network 140 via a fiber transport connection 120. Therefore, the IAB node 102 is an IAB donor. The IAB nodes 104 and 106 are not directly connected to the core network 140. Instead, the IAB nodes 104 and 106 are indirectly connected to the core network 140 via the IAB node 102. For example, the IAB node 104 is connected to the IAB node 102 via a backhaul link 122, such that the IAB node 104 can send data to or receive data from the core network 140 via the backhaul link 122 and the fiber transport connection 120. The IAB node 106 is connected to the IAB node 102 via a backhaul link 124, such that the IAB node 106 can send data to or receive data from the core network 140 via the backhaul link 124 and the fiber transport connection 120. Accordingly, the IAB node 102 functions as a relay node that relays data between the core network 140 and the IAB nodes 104 and 106.

Figure 2:
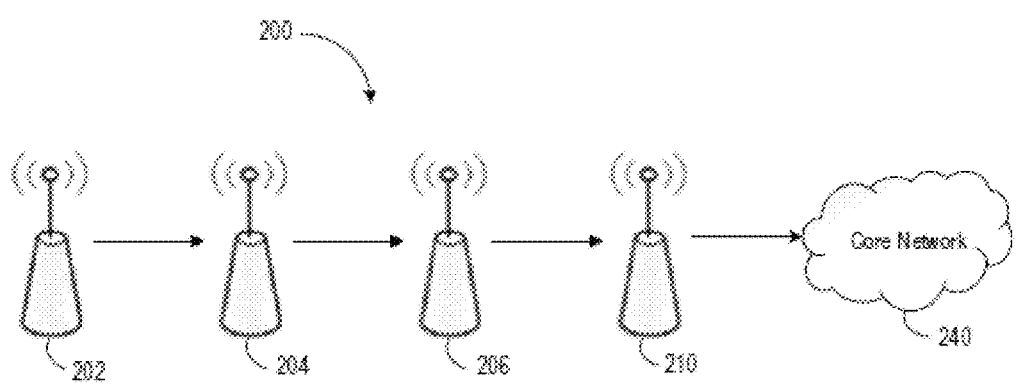
FIG. 2 illustrates an example IAB relay network and/or system in which techniques and other aspects disclosed herein can be implemented, in accordance with an embodiment of the present disclosure.

FIG. 2 illustrates an example IAB relay network and/or system 100 in which techniques and other aspects disclosed herein can be implemented, in accordance with an embodiment of the present disclosure. FIG. 2 demonstrates the deployment flexibility of the IAB link network and/or system 100 described with reference to FIG. 1. Referring to FIGS. 1-2, the IAB relay network 100 includes IAB nodes 202, 204, 206 and 210. The IAB node 210 is connected to a core network 240, making a IAB node 210 the IAB donor. As shown, one or more IAB nodes (e.g., the IAB nodes 204 and 206) can be used as relay nodes for relaying data to an IAB donor, which is the IAB node 210. In other words, the IAB relay network 100 includes multiple IAB levels. An IAB level corresponds to a number of IAB hops needed to communicate data to the IAB donor (the IAB node 210).

In an example in which the IAB donor (the IAB node 210) has an IAB level of 0 and an IAB node to which a UE is directly connected to via an access link has an IAB level of N, the communication path between that UE and the core network 240 includes IAB levels 1, 2, ..., N. In an example in which a connection between IAB nodes can be established via a process that is the same or similar to that by which a UE establishes connection with a base station, an IAB node with an IAB level of n+1 can be seen as a UE to an IAB node with an IAB level of n. On the other hand, the IAB node with the IAB level of n corresponds to a cell that provides communication service to the IAB node with the IAB level of n+1. In an example in which an IAB node with an IAB level of n+1 connections to an IAB node with an IAB level of n using the UE radio interface Uu, the IAB node with the IAB level of n is a parent node of the IAB node with the IAB level of n+1, and the IAB node with the IAB level of n+1 is a child node of the IAB node with the IAB level of n. Every IAB node can be connected to one or more parent IAB nodes.

The present disclosure relates to systems, apparatuses, and methods for improving child IAB node connection interruption caused by poor network link conditions or channel crowding during a relay IAB node handover.

Figure 3B:
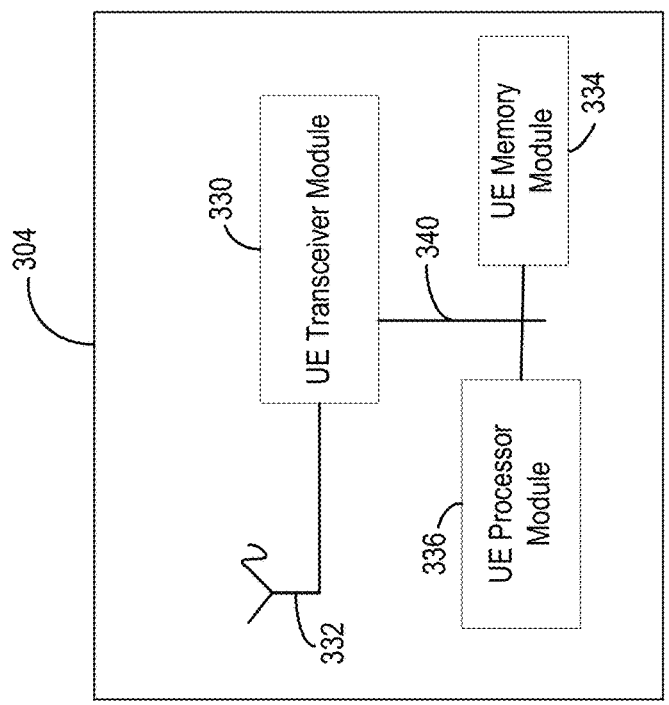
FIG. 3B illustrates a block diagram of an example a UE, in accordance with some embodiments of the present disclosure.
Figure 3A:
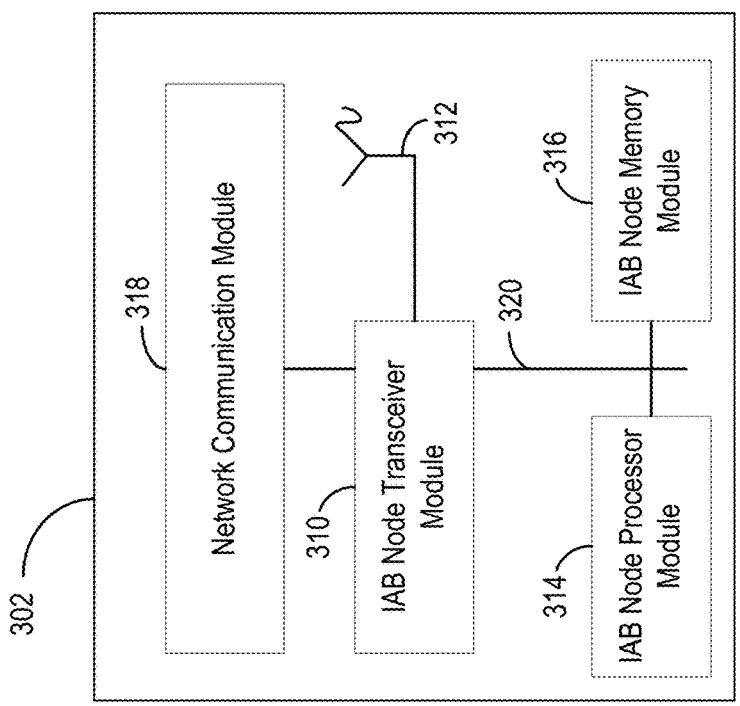
FIG. 3A illustrates a block diagram of an example IAB node, in accordance with some embodiments of the present disclosure.

FIG. 3A illustrates a block diagram of an example IAB node 302, in accordance with some embodiments of the present disclosure. FIG. 3B illustrates a block diagram of an example a UE 304, in accordance with some embodiments of the present disclosure. Referring to FIGS. 1-3B, the IAB node 302 and the UE 304 may include components and elements configured to support known or conventional operating features that need not be described in detail herein. In one illustrative embodiment, the IAB node 302 and the UE 304 can be used to communicate (e.g., transmit and receive) data symbols in a wireless communication environment such as the IAB link network 100 and the IAB relay network 100, as described above. For instance, the IAB node 302 can be an example implementation of the IAB nodes 102, 104, 106, 202, 204, 206, and 210. The UE 304 can be an example implementation of the UEs 112, 114, and 116.

The IAB node 302 includes an IAB node transceiver module 310, an IAB node antenna 312, an IAB node processor module 314, an IAB node memory module 316, and a network communication module 318. The module 310, 312, 314, 316 and 318 are operatively coupled to and interconnected with one another via a data communication bus 320. The UE 304 includes a UE transceiver module 330, a UE antenna 332, a UE memory module 334, and a UE processor module 336. The modules 330, 332, 334, and 336 are operatively coupled to and interconnected with one another via a data communication bus 340. The IAB node 302 communicates with the UE 304 or another IAB node (in a relay network such as but not limited to, the networks 100 and 200) via a communication channel, which can be any wireless channel or other medium suitable for transmission of data as described herein.

As would be understood by persons of ordinary skill in the art, the IAB node 302 and the UE 304 may further include any number of modules other than the modules shown in FIGS. 3A and 3B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 230 includes a radio frequency (RF) transmitter and a RF receiver each comprising circuitry that is coupled to the antenna 332. A duplex switch (not shown) may alternatively couple the RF transmitter or receiver to the antenna in time duplex fashion. Similarly, in accordance with some embodiments, the IAB node transceiver 310 includes a RF transmitter and a RF receiver each having circuity that is coupled to the antenna 312 or the antenna of another IAB node. A duplex switch may alternatively couple the RF transmitter or receiver to the antenna 312 in time duplex fashion. The operations of the two transceiver modules 310 and 330 can be coordinated in time such that the receiver circuitry is coupled to the antenna 332 for reception of transmissions over a wireless transmission link at the same time that the transmitter is coupled to the antenna 312. In some embodiments, there is close time synchronization with a minimal guard time between changes in duplex direction.

The UE transceiver 330 and the IAB node transceiver 310 are configured to communicate via the wireless data communication link, and cooperate with a suitably configured RF antenna arrangement 312/332 that can support a particular wireless communication protocol and modulation scheme. In some illustrative embodiments, the UE transceiver 310 and the IAB node transceiver 310 are configured to support industry standards such as the Long Term Evolution (LTE) and emerging 5G standards, and the like. It is understood, however, that the present disclosure is not necessarily limited in application to a particular standard and associated protocols. Rather, the UE transceiver 330 and the base station transceiver 310 may be configured to support alternate, or additional, wireless data communication protocols, including future standards or variations thereof.

The IAB node transceiver 310 and the transceiver of another IAB node (such as but not limited to, the IAB node transceiver 310) as shown in the networks 100 and 200 are configured to communicate via a wireless data communication link, and cooperate with a suitably configured RF antenna arrangement that can support a particular wireless communication protocol and modulation scheme. In some illustrative embodiments, the IAB node transceiver 310 and the transceiver of another IAB node are configured to support industry standards such as the LTE and emerging 5G standards, and the like. It is understood, however, that the present disclosure is not necessarily limited in application to a particular standard and associated protocols. Rather, the IAB node transceiver 310 and the transceiver of another IAB node may be configured to support alternate, or additional, wireless data communication protocols, including future standards or variations thereof.

In accordance with various embodiments, the IAB node 302 may be a base station such as but not limited to, an eNB, a serving eNB, a target eNB, a femto station, or a pico station, for example. The IAB node 302 can be an RN, a regular IAB node, a DeNB, or an IAB donor. In some embodiments, the UE 304 may be embodied in various types of user devices such as a mobile phone, a smart phone, a personal digital assistant (PDA), tablet, laptop computer, wearable computing device, etc. The processor modules 314 and 336 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 314 and 336, respectively, or in any practical combination thereof. The memory modules 316 and 334 may be realized as RAM memory, flash memory, ROM memory, EPROM memory, EEPROM memory, registers, a hard disk, a removable disk, a CD-ROM, or any other form of storage medium known in the art. In this regard, memory modules 316 and 334 may be coupled to the processor modules 310 and 330, respectively, such that the processors modules 310 and 330 can read information from, and write information to, memory modules 316 and 334, respectively. The memory modules 316 and 334 may also be integrated into their respective processor modules 310 and 330. In some embodiments, the memory modules 316 and 334 may each include a cache memory for storing temporary variables or other intermediate information during execution of instructions to be executed by processor modules 310 and 330, respectively. Memory modules 316 and 334 may also each include non-volatile memory for storing instructions to be executed by the processor modules 310 and 330, respectively.

The network communication module 318 generally represents the hardware, software, firmware, processing logic, and/or other components of the IAB node 302 that enable bi-directional communication between IAB node transceiver 310 and other network components and communication nodes in communication with the IAB node 302. For example, the network communication module 318 may be configured to support internet or WiMAX traffic. In a deployment, without limitation, the network communication module 318 provides an 802.3 Ethernet interface such that IAB node transceiver 310 can communicate with a conventional Ethernet based computer network. In this manner, the network communication module 318 may include a physical interface for connection to the computer network (e.g., Mobile Switching Center (MSC)). In some embodiments in which the IAB node 302 is an IAB donor, the network communication module 318 includes a fiber transport connection configured to connect the IAB node 302 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Figure 4A:
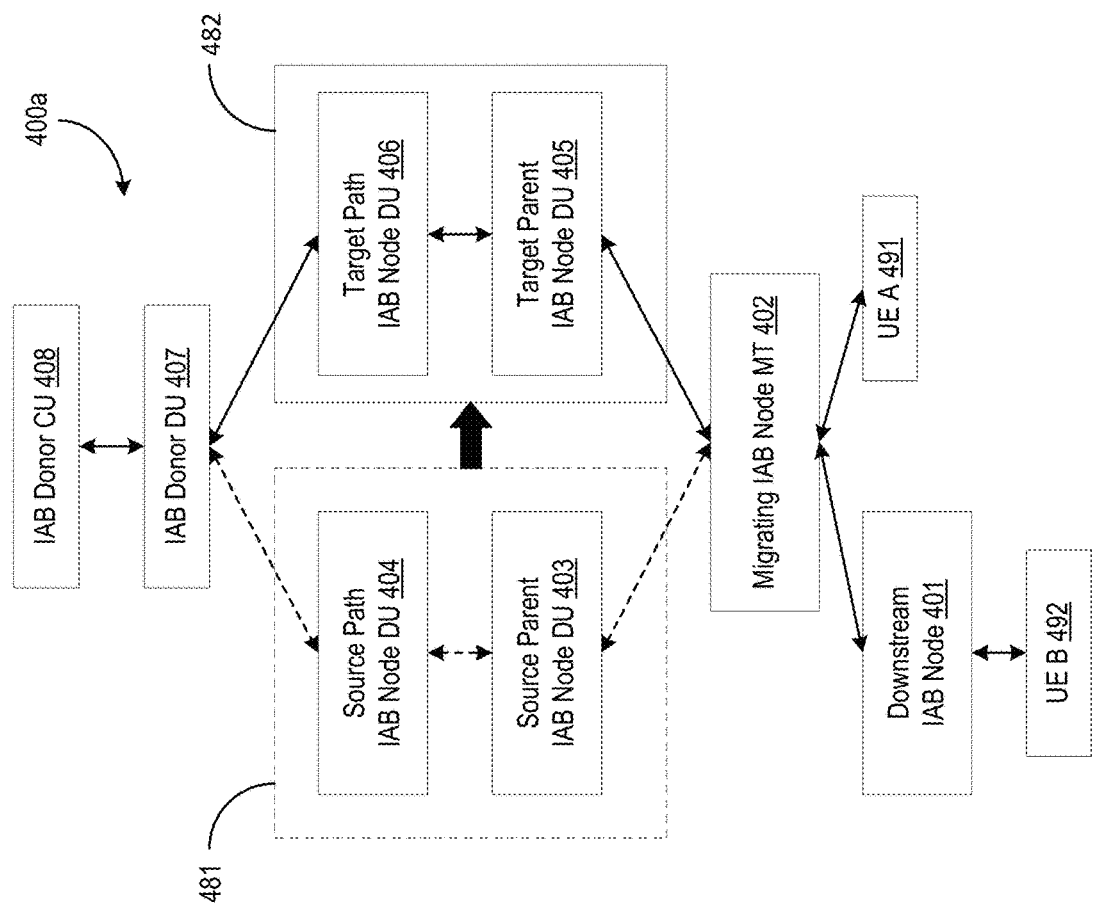
FIG. 4A illustrates a diagram depicting an intra-donor HO, in accordance with some embodiments of the present disclosure.

FIG. 4A illustrates a diagram depicting an intra-donor HO 400a, in accordance with some embodiments of the present disclosure. Referring to FIGS. 1-4A, before the intra-donor HO 400a, data is communicated via a source path 481. For instance, downlink data is sent from an IAB donor central unit (CU) 408 (a gNB-CU) to an IAB donor DU 407, which relays the downlink data to a source path IAB node DU 404 (a gNB-DU), which relays the downlink data to the source parent IAB node DU 403, which relays the downlink data to a migrating IAB node MT 402. The migrating IAB node MT 402 can relay the downlink data to UE A 491, which is connected directly to the migrating IAB node MT 402 via an access link. The migrating IAB node MT 402 can relay the downlink data to a downstream IAB node 401, which relays the downlink data to UE B 492, which is connected directly to the downstream IAB node 401 via an access link. Uplink data is sent by the UE A 491 to the migrating IAB node MT 402 and by the UE B 492 to the downstream IAB node 401, which relays the uplink data to the migrating IAB node MT 402. The migrating IAB node MT 402 relays the uplink data to the source parent IAB node DU 403, which relays the uplink data to the source path IAB node DU 404, which relays the uplink data to the IAB donor DU 407, which relays the uplink data to the IAB donor CU 408. The source path 481 includes the source path IAB node DU 404 and the source parent IAB node DU 403. The source parent IAB node DU 403 is the parent node of the migrating IAB node MT 402, which has satisfied the threshold for triggering a HO (e.g., determined based on suitable measurement report described herein). Upstream/northbound IAB nodes of the migrating IAB node MT 402 in the source path 481 includes nodes 403, 404, 407, and 408. Downstream/southbound IAB node of the migrating IAB node MT 402 includes the downstream IAB node 401.

After the intra-donor HO 400a (e.g., after an HO execution phase is performed as described herein), data is communicated via a target path 482. For instance, downlink data is sent from the IAB donor CU 408 to the IAB donor DU 407, which relays the downlink data to a target path IAB node DU 406, which relays the downlink data to a target parent IAB node DU 405, which relays the downlink data to the migrating IAB node MT 402. The migrating IAB node MT 402 can relay the downlink data to the UE A 491. The migrating IAB node MT 402 can relay the downlink data to the downstream IAB node 401, which relays the downlink data to the UE B 492. Uplink data is sent by the UE A 491 to the migrating IAB node MT 402 and by the UE B 492 to the downstream IAB node 401, which relays the uplink data to the migrating IAB node MT 402. The migrating IAB node MT 402 relays the uplink data to the target parent IAB node DU 405, which relays the uplink data to the target path IAB node DU 406, which relays the uplink data to the IAB donor DU 407, which relates the uplink data to the IAB donor CU 408. The target path 482 includes the target path IAB node DU 406 and the target parent IAB node DU 405. The target parent IAB node DU 405 is the parent node of the migrating IAB node MT 402 after the HO. Upstream/northbound IAB nodes of the migrating IAB node MT 402 in the target path 482 includes nodes 405, 406, 407, and 408. Downstream/southbound IAB node of the migrating IAB node MT 402 includes the downstream IAB node 401.

Any parent nodes described herein refers to a node directly upstream from the migrating IAB node MT 402 in the source path 481 or in the target path 482. While the intra-donor HO 400*a* shows two nodes in either the source path 481 or the target path 482, either the source path 481 or the target path 482 can include one (e.g., only the parent node) or three or more (e.g., multiple source path nodes or multiple target path nodes) IAB nodes.

Figure 4B:
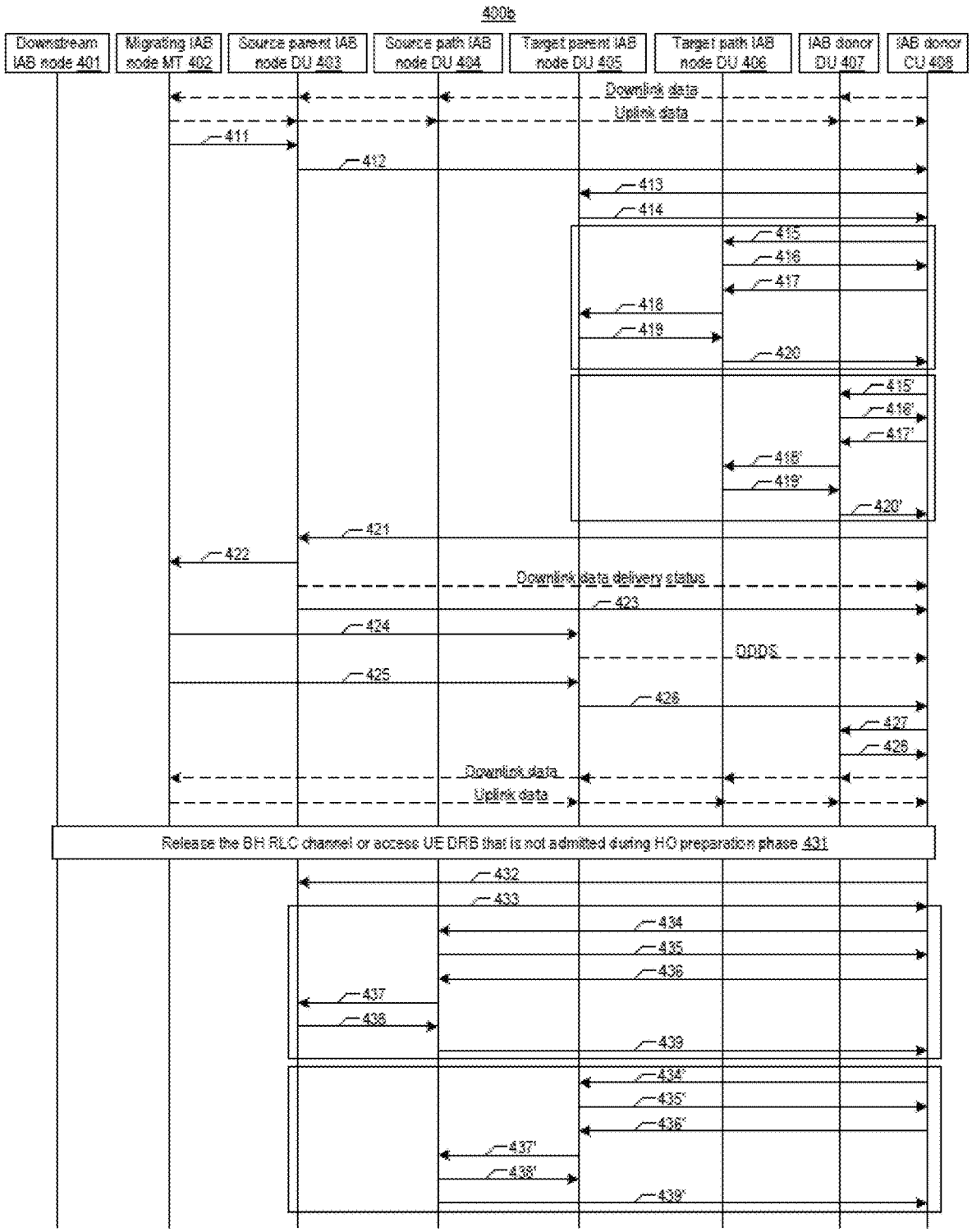
FIG. 4B illustrates a process flowchart diagram of an intra-donor HO method, in accordance with some embodiments of the present disclosure.

FIG. 4B illustrates a process flowchart diagram of an intra-donor HO method 400*b*, in accordance with some embodiments of the present disclosure. Referring to FIGS. 1-4B, the HO method 400*b* is an intra-donor DU HO signaling procedure for the intra-donor HO 400*a* for the IAB node MT 402. The HO method 400*b* includes three phases: HO preparation, HO execution, and HO completion. The HO preparation phase includes operations/processes denoted as 411-420 (420'). The HO execution phase includes operations/processes denoted as 421-428. The HO completion phase includes operations/processes denoted as 431-419 (439').

Before the HO preparation phase, downlink data is sent through the source path 481, e.g., from the IAB donor CU 408 to the IAB donor DU 407, which relays the downlink data to the source path IAB node DU 404, which relays the downlink data to the source parent IAB node DU 403, which relays the downlink data to the migrating IAB node MT 402. Uplink data is sent through the source path 481, e.g., from the migrating IAB node MT 402 to the source parent IAB node DU 403, which relays the uplink data to the source path IAB node DU 404, which relays the uplink data to the IAB donor DU 407, which relays the uplink data to the IAB donor CU 408.

In the HO preparation phase, the migrating IAB node MT 402 sends a measurement report to the IAB donor CU 408. For example, at 411, the migrating IAB node MT 402 sends the measurement report to the source parent IAB node DU 403, and the source parent IAB node DU 403 sends the measurement report via uplink radio resource control (RRC) transfer at 412 to the IAB donor CU 408. The IAB donor CU 408 determines whether to handover connection for the migrating IAB node MT 402 from the source nodes 403 and 404 (e.g., from the source path 481) to the target nodes 405 and 406 (e.g., to the target path 482). In response to determining that the connection for the migrating IAB node MT 402 is to be handed over from the source parent IAB node DU 403 to the target parent IAB node DU 405, HO preparations are made.

For example, the IAB donor CU 408 identifies all intermediate IAB nodes (including the target path IAB node DU 406) in the target path 482 between the parent IAB node DU 405 and the IAB donor CU 408. Based on one or more of signaling radio bearer (SRB), access data radio bearers (DRB), or backhaul (BH) radio link control (RLC) channel established by the migrating IAB node MT 402, the IAB donor CU 408 determines whether to modify configurations that the intermediate IAB nodes apply to the BH RLC channel to support the SRB access DRB/BH RLC channel. In response to determining that modifications are needed, the IAB donor CU 408 sends BH RLC channel configuration messages to the identified intermediate IAB nodes (e.g., the target path IAB node DU 406). The BH RLC channel configuration messages include but are not limited to, control signaling/user packet indication, BH RLC channel level quality-of-service (QoS) profile/UE bearer level QoS profile/QoS flow level QoS profile for user plane BH RLC channel, SRB QoS, and so on. In addition, adapt configurations (e.g., bearer mapping and related configurations) of the IAB nodes in the target path 482 can be updated while the BH RLC channel is configured for the IAB nodes in the target path 482. Additional updates of routing configurations can be applied to IAB nodes in the target path 482 that do not overlap with any IAB nodes in the source path 481. Given that before HO execution is completed for the migrating IAB node MT 402, HO-related control signal commands and data packets for the source path 481 may still need to be maintained, routing pre-configuration can be executed only on the IAB nodes in the target path 482 that do not overlap with any IAB nodes in the source path 481. Routing pre-configuration can be executed on the IAB nodes the target path 482 that overlap with any IAB nodes in the source path 481 after HO execution is completed for the migrating IAB node MT 402.

In that regard, at 413, the IAB donor CU 408 sends a UE/IAB context setup request to the target parent IAB node DU 405. The UE/IAB context setup request includes at least an IAB indication, a DRB list, a BH RLC channel list, adapt configurations, routine configurations, and so on. At 414, the target parent IAB node DU 405 sends a UE/IAB context setup response to the IAB donor CU 408. The UE/IAB context setup response includes at least admitted DRBs, admitted RLC channels and associated configurations, and so on.

At 415-420, the IAB donor CU 408 configures the BH RLC channel, updates the adapt configurations that includes bearer mapping and routing on the target parent IAB node DU 405. At 415, the IAB donor CU 408 sends an IAB BH modification request to the target path IAB node DU 406. The IAB BH modification request includes at least an IAB indication, a DRB list, a BH RLC channel list, adapt configurations, routine configurations, and so on. At 416, the target path IAB node DU 406 sends an IAB BH modification response to the IAB donor CU 408. The IAB BH modification response includes at least admitted DRBs, admitted RLC channels and associated configurations, and so on. At 417, the IAB donor CU 408 performs a downlink RRC transfer (e.g., RRC reconfiguration, RRCConnectionReconfiguration, or RRCReconfiguration) with respect to the target path IAB node DU 406. At 418, the target path IAB node DU 406 performs the RRC reconfiguration with the target parent IAB node DU 405. At 419, the target parent IAB node DU 405 returns a RRC reconfiguration complete message to the target path IAB node DU 406. At 420, the target path IAB node DU 406 performs downlink RRC transfer to the IAB donor CU 408, forwarding the RRC reconfiguration complete (RRCReconfigurationComplete) message.

At 415'-420', the IAB donor CU 408 configures the BH RLC channel, updates the adapt configurations that includes bearer mapping and routing on the target path IAB node DU 406. At 415', the IAB donor CU 408 sends an IAB BH modification request to the IAB donor DU 407. The IAB BH modification request includes at least an IAB indication, a DRB list, a BH RLC channel list, adapt configurations, routine configurations, and so on. At 416', the IAB donor DU 407 sends an IAB BH modification response to the IAB donor CU 408. The IAB BH modification response includes at least admitted DRBs, admitted RLC channels and associated configurations, and so on. At 417', the IAB donor CU 408 performs a downlink RRC transfer (e.g., RRC reconfiguration) with respect to the IAB donor DU 407. At 418', the IAB donor DU 407 performs the RRC reconfiguration with the target path IAB node DU 406. At 419', the target path IAB node DU 406 returns a RRC reconfiguration complete message to the IAB donor DU 407. At 420, the IAB donor DU 407 performs downlink RRC transfer to the IAB donor CU 408, forwarding the RRC reconfiguration complete message.

415-420 and 415'-420' are intended to show that IAB donor CU 408 configures the BH RLC channel, updates the adapt configurations that includes bearer mapping and routing on all target path IAB nodes (e.g., 405 and 406) in the target path 482 that do not overlap with those IAB nodes in the source path 481.

In the HO execution phase, the migrating IAB node MT 402 receives a HO command from the IAB donor CU 408 and initiates the HO process. Responsive to the IAB donor CU 408 completing a random access procedure for the target parent IAB node DU 405, the target parent IAB node DU 405 sends a downlink data delivery status (DDDS) to the IAB donor CU 408, thus triggering the target parent IAB node DU 405 sending route configuration update to the IAB nodes in the target path 482. In some examples in which route configuration update is already completed for the IAB nodes that do not overlap with those in the source path 481 during the HO preparation phase, route configuration update is performed for only the IAB nodes in the target path 482 that overlap with those in the source path 481 during the HO execution phase. Responsive to all IAB nodes in the target path 482 completing the route configuration update, the IAB donor CU 408 can send downlink data to the migrating IAB node MT 402 via the target path 482. Furthermore, uplink data can likewise be sent from the migrating IAB node MT 402 to the IAB donor CU 408 via the target path 482.

In addition, given that any child node (e.g., the downstream IAB node 401) and grandchild node (if any) of the migrating IAB node MT 402 do not have any knowledge of the HO or migration with respect to the migrating IAB node MT 402, data packets sent by those child/grandchild nodes to the migrating IAB node MT 402 still have destination address or routing identifier that correspond to source path destination address or source path routing identifier. Such source path destination address or source path routing identifier may be carried in the adapter (adaptation) layer. After the migrating IAB node MT 402 is handed over to the target parent IAB node DU 405, the source path destination address or source path route identifier in the to-be-sent data packets is changed to the target path destination address or target path route identifier.

Furthermore, after the migrating IAB node MT 402 receives an RRC reconfiguration message and is notified of the HO, the migrating IAB node MT 402 is also notified that routing may change. Thus, the migrating IAB node MT 402 sends a DDDS frame to inform the IAB donor CU 408 about the unsuccessfully transmitted downlink data to the migrating IAB node MT 402.

Still further, the routes for the migrating IAB node MT 402 and all downlink IAB nodes (e.g., the downstream IAB node 401) of the migrating IAB node MT 402 may be updated. Therefore, responsive to the migrating IAB node MT 402 being notified of the route update, the migrating IAB node MT 402 can send a DDDS frame to inform the IAB donor CU 408 about the unsuccessfully transmitted downlink data to the migrating IAB node MT 402.

The migrating IAB node MT 402 can obtain the updated routing according to various approaches. For example, responsive to the migrating IAB node MT 402 receiving the RRC reconfiguration message and being notified of the HO, the migrating IAB node MT 402 is configured to send a HO indication or routing update indication to any child node of the migrating IAB node MT 402, and the child node, in turn, responsive to receiving the HO indication or routing update indication, relays the HO indication or routing update indication to any child node of the child node, and so on. In some examples, the HO indication or routing update indication can include an IAB node identifier of the migrating IAB node MT 402. In some examples, the HO indication or routing update indication includes a HO type, and the HO type is one of an inter-CU HO, an intra-CU HO, or an intra-DU HO.

Responsive to the IAB donor CU 408 determining to allow the HO for the migrating IAB node MT 402, the IAB donor CU 408 sends routing update information to all downstream IAB nodes of the migrating IAB node MT 402. The routing update (configuration) information can be carried in an RRC reconfiguration message or an F1-AP message. The IAB donor CU 408 may send the routing update information after block 1 or block 6 described in the following flow:

Block 1. The gNB-CU sends a UE CONTEXT MODIFICATION REQUEST message to the source gNB-DU, which includes a generated RRCReconfiguration message and indicates to stop the data transmission for the UE. The source gNB-DU also sends a Downlink Data Delivery Status frame to inform the gNB-CU about the unsuccessfully transmitted downlink data to the UE or IAB.

Block 2. The source gNB-DU forwards the received RRCReconfiguration message to the IAB.

Block 3. The source gNB-DU responds to the gNB-CU with the UE CONTEXT MODIFICATION RESPONSE message.

Block 4. Random access procedure

Block 5. The IAB responds to the target gNB-DU with an RRCReconfigurationComplete message.

Block 6. The target gNB-DU sends an UL RRC MESSAGE TRANSFER message to the gNB-CU to convey the received RRCReconfigurationComplete message. Downlink packets are sent to the UE. Also, uplink packets are sent from the UE, which are forwarded to the gNB-CU through the target gNB-DU.

In that regard, at 421, the IAB donor CU 408 sends a UE context modification request to the source parent IAB node DU 403. The UE context modification request includes at least RRC reconfiguration message, a transmission stop indicator, and so on. At 422, the source parent IAB node DU 403 performs RRC reconfiguration (with synchronization) for the migrating IAB node MT 402. The source parent IAB node DU 403 may send a DDDS to the IAB donor CU 408. At 423, the source parent IAB node DU 403 sends a UE context modification response to the IAB donor CU 408. At 424, the migrating IAB node MT 402 performs a random access procedure with the target parent IAB node DU 405. The target parent IAB node DU 405 may send a DDDS to the IAB donor CU 408, in response to the random access procedure, as described. At 425, the migrating IAB node MT 402 sends an RRC reconfiguration complete message to the target parent IAB node DU 405. At 426, the target parent IAB node DU 405 performs uplink RRC transfer to the IAB donor CU 408, forwarding the RRC reconfiguration complete message. At 427, the IAB donor CU 408 sends an IAB BH modification request (including route configuration update) to the IAB donor DU 407, and the IAB donor DU 407 sends a IAB BH modification response to the IAB donor CU 408 at 428.

Following the HO execution phase from 421-428, the IAB donor CU 408 sends the downlink data to the IAB donor DU 407, which relays the downlink data to the target path IAB node DU 406, which relays the downlink data to the target parent IAB node DU 405, which relays the downlink data to the migrating IAB node MT 402. The migrating IAB node MT 402 can send the uplink data to the target parent IAB node DU 405, which relays the uplink data to the target path IAB node DU 406, which relays the uplink data to the IAB donor DU 407, which relates the uplink data to the IAB donor CU 408.

In the HO completion phase or post-HO completion phase, the IAB donor CU 408 can screen which DRB and/or BH RLC channel of the downstream IAB node 401 and access UE (e.g., UEs 491 and 492) should be released, given that it is possible that the BH RLC channel of the migrating IAB node MT 402 has not been accepted during the HO. If the DRB of the access UE is released, corresponding GPRS Tunneling Protocol (GTP)-U tunnel should be released through completion of UE context modification of F1 interface. The release of the DRB and/or BH RLC channel and releasing GTP-U tunnel are referred to as cleanup tasks. In some examples, the IAB donor CU 408 can initiate such UE DRB and/or BH RLC channel cleanup tasks after or in response to the migrating IAB node MT 402 completing the HO execution phase. Furthermore, the IAB donor CU 408 initiates, with the source parent IAB node DU 403 on the source path, context release of the migrating IAB node MT 402. The IAB donor CU 408 initiates, with other IAB nodes in the source path 481, adapt configuration update, and possibly, BH RLC channel configuration modification.

As described, at least one IAB node (e.g., the downstream IAB node 401) is downstream from the migrating IAB node MT 402. The DRB and BH RLC channel of the downstream IAB node 401 and the access UEs 491 and 492 are released and/or updated after the HO is completed given that as the migrating IAB node MT 402 has satisfied HO conditions, if the DRB and BH RLC channel of the downstream IAB node 401 and the access UE 491 and 492 are not switched on time, radio link failure (RLF) and even service may be interrupted.

In that regard, at 431, the IAB donor CU 408 is configured to release the BH RLC channel and/or the access UE DRB that are not admitted during the HO preparation phase. At 432-433, the IAB donor CU 408 releases the UE context of the source parent IAB node 403. For example, at 432, the IAB donor CU 408 sends a UE/IAB context release command to the source parent IAB node DU 403. The UE/IAB context release command includes BH RLC channels to be released, adapt configurations to be modified, and so on. At 433, the source parent IAB node DU 403 sends a UE/IAB context release completion message to the IAB donor CU 408.

At 434-439, the IAB donor CU 408 releases the BH RLC channels that are no longer needed in the source parent IAB node 403 and updates the adapt configuration of the source parent IAB node 403. At 434, the IAB donor CU 408 sends an IAB BH modification request to the source path IAB node DU 404. The IAB BH modification request includes one or more of BH RLC channels to be released, modify list, adapt configurations to be modified, and so on. At 435, the source path IAB node DU 404 sends an IAB BH modification response to the IAB donor CU 408. At 436, the IAB donor CU 408 performs a downlink RRC transfer with the source path IAB node DU 404 for RRC reconfiguration. At 437, the source path IAB node DU 404 performs RRC reconfiguration with the source parent IAB node DU 403. At 438, the source parent IAB node DU 403 sends an RRC reconfiguration complete message to the source path IAB node DU 404. The source path IAB node DU 404 sends an RRC reconfiguration complete message to the IAB donor CU 408, concluding the downlink RRC transfer, 439.

At 434'-439', the IAB donor CU 408 releases the BH RLC channels that are no longer needed in the source path IAB node DU 404 and updates the adapt configuration of the source path IAB node DU 404. At 434', the IAB donor CU 408 sends an IAB BH modification request to the target path IAB node DU 405. The IAB BH modification request includes one or more of BH RLC channels to be released, modify list, adapt configurations to be modified, and so on. At 435', the target path IAB node DU 405 sends an IAB BH modification response to the IAB donor CU 408. At 436', the IAB donor CU 408 performs a downlink RRC transfer with the target path IAB node DU 405 for RRC reconfiguration. At 437', the target path IAB node DU 405 performs RRC reconfiguration with the source path IAB node DU 404. At 438', the source path IAB node DU 404 sends an RRC reconfiguration complete message to the target path IAB node DU 405. The target path IAB node DU 405 sends an RRC reconfiguration complete message to the IAB donor CU 408, concluding the downlink RRC transfer, 439'.

434-439 and 434-439 are intended to show that IAB donor CU 408 releases the BH RLC channels that are no longer necessary along the source path 481 (e.g., nodes 403 and 404) and updates the adapt configuration of IAB nodes along the source path 481.

Figure 4C:
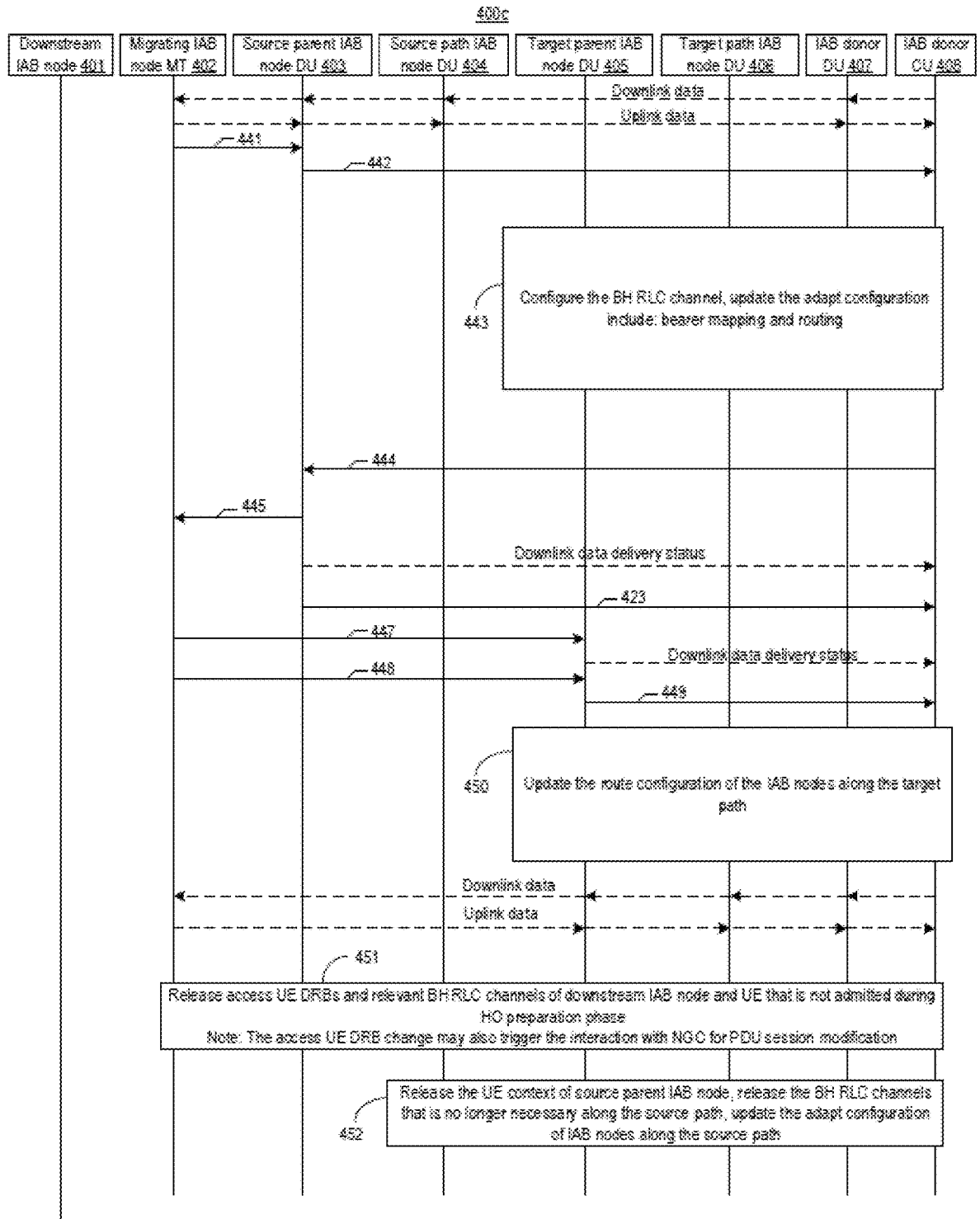
FIG. 4C illustrates a process flowchart diagram of an intra-donor HO method, in accordance with some embodiments of the present disclosure.

FIG. 4C illustrates a process flowchart diagram of an intra-donor HO method 400c, in accordance with some embodiments of the present disclosure. Referring to FIGS. 1-4C, the intra-donor HO method 400b is an example implementation of the intra-donor HO method 400c. The HO method 400c includes three phases: HO preparation, HO execution, and HO completion. The HO preparation phase includes operations/processes denoted as 441-443. The HO execution phase includes operations/processes denoted as 444-450. The HO completion phase includes operations/processes denoted as 451 and 452.

Before the HO preparation phase, the downlink data is sent through the source path 481, e.g., from the IAB donor CU 408 to the IAB donor DU 407, which relays the downlink data to the source path IAB node DU 404, which relays the downlink data to the source parent IAB node DU 403, which relays the downlink data to the migrating IAB node MT 402. Uplink data is sent through the source path 481, e.g., from the migrating IAB node MT 402 to the source parent IAB node DU 403, which relays the uplink data to the source path IAB node DU 404, which relays the uplink data to the IAB donor DU 407, which relays the uplink data to the IAB donor CU 408.

At 441 (411), the migrating IAB node MT 402 sends the measurement report to the source parent IAB node DU 403, and the source parent IAB node DU 403 sends the measurement report via uplink RRC transfer at 442 (412) to the IAB donor CU 408.

At 443, the IAB donor CU 408 configures the BH RLC channel, updates the adapt configurations that includes bearer mapping and routing on the target path IAB nodes (e.g., 405 and 406). The IAB donor DU 407 and the source path IAB node DU 404 are used to forward any data such as but not limited to, signaling data, user plane (UP) packets, and so on before the HO execution is completed. Thus, routing configuration can be performed on the target path IAB nodes (e.g., 405 and 406) that do not overlap with IAB nodes in the source path 481. Example implementations of 443 include but are not limited to, 415-420 and 415'-420'.

At 444 (421), the IAB donor CU 408 sends the UE context modification request to the source parent IAB node DU 403. At 445 (422), the source parent IAB node DU 403 performs RRC reconfiguration (with synchronization) for the migrating IAB node MT 402. The source parent IAB node DU 403 may send a DDDS to the IAB donor CU 408. At 446 (423), the source parent IAB node DU 403 sends a UE context modification response to the IAB donor CU 408. At 447 (424), the migrating IAB node MT 402 performs a random access procedure with the target parent IAB node DU 405. The target parent IAB node DU 405 may send the DDDS to the IAB donor CU 408, in response to the random access procedure, as described. At 448 (425), the migrating IAB node MT 402 sends an RRC reconfiguration complete message to the target parent IAB node DU 405. At 449 (426), the target parent IAB node DU 405 performs uplink RRC transfer to the IAB donor CU 408, forwarding the RRC reconfiguration complete message.

At 450, the IAB donor CU 408 updates the route configuration of the IAB nodes on the target path 482. The route configuration needs to be performed for IAB nodes of the target path 482 that are overlapping with those IAB nodes in the source path 481. As described, the route configuration of the IAB nodes in the target path 482 that do not overlap with those IAB nodes in the source path 481 can be updated during HO preparation phase (e.g., at 443). Example implementations of 450 include but are not limited to, 427 and 428

Following the HO execution phase from 444-450, downlink data is sent through the target path 482, e.g., the IAB donor CU 408 sends the downlink data to the IAB donor DU 407, which relays the downlink data to the target path IAB node DU 406, which relays the downlink data to the target parent IAB node DU 405, which relays the downlink data to the migrating IAB node MT 402. Uplink data can be sent through the target path 482, e.g., the migrating IAB node MT 402 can send the uplink data to the target parent IAB node DU 405, which relays the uplink data to the target path IAB node DU 406, which relays the uplink data to the IAB donor DU 407, which relates the uplink data to the IAB donor CU 408.

In the HO completion phase or post-HO completion phase, the IAB donor CU 408 releases access UE DRBs and relevant BH RLC channels of the downstream IAB node 401 (downstream from the IAB node MT 402) and the UE that is not admitted during the HO preparation phase, at 451. Examples implementations of 451 include but are not limited to, 431-433. The access UE DRB change may trigger an interaction with Next Generation Core (NGC) for Protocol Data Unit (PDU) session modification.

At 452, the IAB donor CU 408 releases the UE context of the source parent IAB node 403 (432-433). At 452, the IAB donor CU 408 further releases the BH RLC channels that are no longer needed in the source path 481, and updates the adapt configuration of IAB nodes in the source path 481, e.g., at 434-439 and 434'-439'.

The HO methods 400*b* and 400*c* use various types of UP data for the migrating IAB node MT 402. Examples of such UP data include but are not limited to, DRB of the migrating IAB node MT 402, DRB of the access UE 491 directly serviced by the migrating IAB node MT 402, DRB of the grand-child access UE 492 indirectly serviced by the migrating IAB node MT 402 (e.g., directly serviced by the downstream IAB node 401), and so on.

The GTP-U tunnel and tunnel endpoint identifier (TEID) corresponding to the DRB of the migrating IAB node MT 402 are assigned or otherwise allocated new uplink TEID and downlink TED as the IAB donor CU 408 exchanges the UE context setup request/response with the target parent IAB node DU 405 (413 and 414).

The GTP-U tunnel corresponding to the DRB of the access UE 491 is between the migrating IAB node MT 402 and the IAB donor CU 408. In the intra-donor HO 400*a*, the DRB of the access UE 491 can remain the same, without being altered. In some examples in which some of the DRB of the access UE 491 may need to be released, F1-U channel and air interface DRB corresponding to those DRB may also need to be released The F1-U tunnel corresponding to the DRB of the grand-child access UE 492 is between the downstream IAB node (DU) 401 and the IAB donor CU 208, and therefore can also remain the same, without being altered.

With respect to 1:1 bearer mapping, downstream BH RLC channel and corresponding access UE DRB can be derived from BH RLC channel of the migrating IAB node MT 402 that has not been accepted during the HO preparation phase. The IAB donor CU 208 can initiate release of the downstream BH RLC channel and corresponding access UE DRB.

With respect to N:1 bearer mapping, the IAB donor CU 208 may further need to modify or release the BH RLC channel and the access UE DRB based on bearer mapping rules.

The HO methods 400*b* and 400*c* use various types of control plane (CP) data for the migrating IAB node MT 402. Examples of those types of CP data include but are not limited to, F1-C of the migrating IAB node MT 402, UE associated F1-C of parent IAB node corresponding to the MT part of the migrating IAB node MT 402, UE associated F1-C of the access UE 491 of the migrating IAB node MT 402, and so on.

With regard to the F1-C interface between the migrating IAB node MT 402 and the IAB donor CU 208, when the HO to the target IAB node DU 405 is completed, the IAB donor CU 208 and uplink aspect of the target path 482 is operational. Responsive to the IAB donor CU 208 receiving a HO command (e.g., the DDDS, connection reconfiguration complete message sent by the migrating IAB node MT 402, and so on), the IAB donor CU 208 can update its route table. Responsive to the IAB donor CU 208 completes updating the route table for the IAB nodes in the target path 482, the downlink aspect of the target path 482 from the IAB donor CU 208 to the migrating IAB node MT 402 becomes operational. The stream control transmission protocol (SCTP) connection between the IAB donor CU 208 to the migrating IAB node MT 402 remains valid, such that no updating is needed.

The UE context setup request/response messages (e.g., at 413 and 414) exchanged between the IAB donor CU 208 and the target parent IAB node DU 405 includes allocation information for new gNB-CU F1 application protocol identity (F1AP ID) and gNB-DU F1AP ID. In addition, the UE context setup response (e.g., at 414) includes the Cell Radio Network Temporary Identifier (C-RNTI) information that the target parent IAB node DU 405 has configured for the migrating IAB node MT 402. The UE context setup response may further include the RLC or RLC channel configuration information assigned for the migrating IAB node MT 402. In response to the IAB donor CU 208 receiving such information in the UE context setup response, the IAB donor CU 208 determines RRC reconfiguration information, which includes the C-RNTI that the target parent IAB node DU 405 configured and complete RB configuration information. The IAB donor CU 208 sends the RRC reconfiguration information to the migrating IAB node MT 402 (e.g., at 421 and 422) to instruct the migrating IAB node MT 402 to perform the HO.

The UE associated F1-C of the access UE 491 of the migrating IAB node MT 402 can remain the same, without being altered post-HO.

Figure 5A:
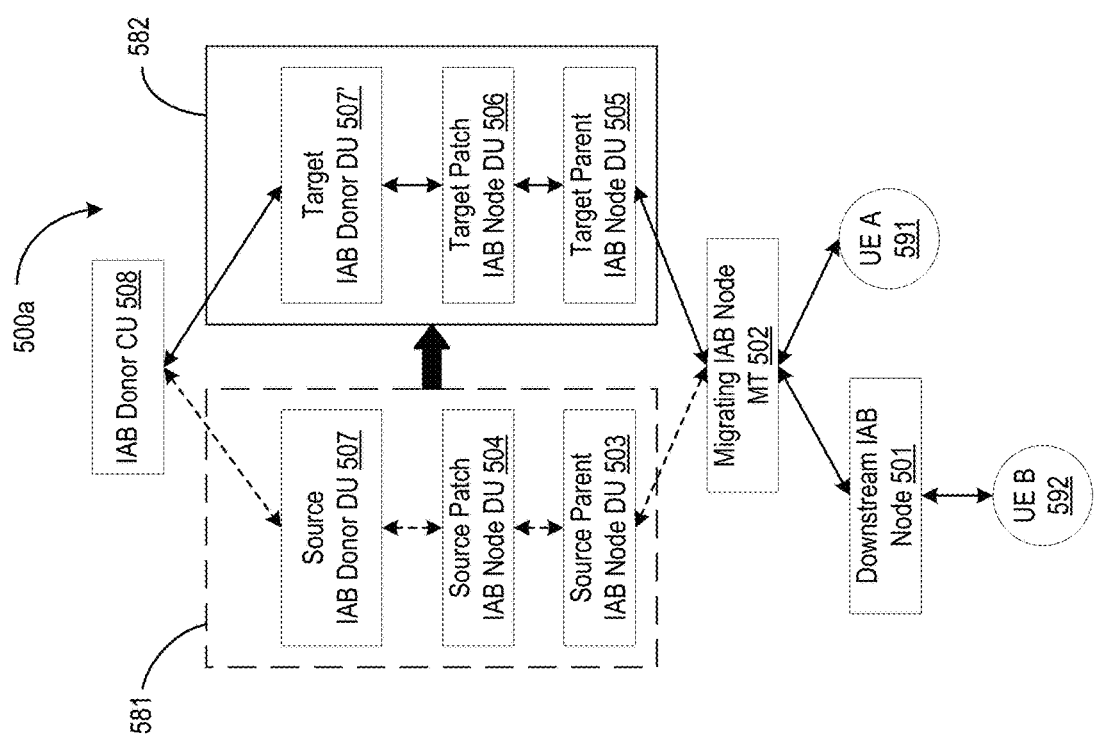
FIG. 5A illustrates a diagram depicting an inter-donor DU HO, in accordance with some embodiments of the present disclosure.

FIG. 5A illustrates a diagram depicting an inter-donor DU HO 500a, in accordance with some embodiments of the present disclosure. Referring to FIGS. 1-5A, before the inter-donor DU HO 500a, data is communicated via a source path 581. For instance, downlink data is sent from an IAB donor CU 508 to a source IAB donor DU 507, which relays the downlink data to a source path IAB node DU 504, which relays the downlink data to a source parent IAB node DU 503, which relays the downlink data to a migrating IAB node MT 502. The migrating IAB node MT 502 can relay the downlink data to UE A 591, which is connected directly to the migrating IAB node MT 502 via an access link. The migrating IAB node MT 502 can relay the downlink data to a downstream IAB node 501, which relays the downlink data to UE B 592, which is connected directly to the downstream IAB node 501 via an access link. Uplink data is sent by the UE A 591 to the migrating IAB node MT 502 and by the UE B 592 to the downstream IAB node 501, which relays the uplink data to the migrating IAB node MT 502. The migrating IAB node MT 502 relays the uplink data to the source parent IAB node DU 503, which relays the uplink data to the source path IAB node DU 504, which relays the uplink data to the source IAB donor DU 507, which relays the uplink data to the IAB donor CU 508. The source path 581 includes the source IAB donor DU 507, the source path IAB node DU 504, and the source parent IAB node DU 503. The source parent IAB node DU 503 is the parent node of the migrating IAB node MT 502, which has satisfied the threshold for triggering a HO (e.g., determined based on suitable measurement report described herein).

After the inter-donor DU HO 500a (e.g., after an HO execution phase is performed as described herein), data is communicated via a target path 582. For instance, downlink data is sent from the IAB donor CU 508 to a target IAB donor DU 507' (different from the source IAB donor DU 507), which relays the downlink data to a target path IAB node DU 506, which relays the downlink data to a target parent IAB node DU 505, which relays the downlink data to the migrating IAB node MT 502. The migrating IAB node MT 502 can relay the downlink data to the UE A 591. The migrating IAB node MT 502 can relay the downlink data to the downstream IAB node 501, which relays the downlink data to the UE B 592. Uplink data is sent by the UE A 591 to the migrating IAB node MT 502 and by the UE B 592 to the downstream IAB node 501, which relays the uplink data to the migrating IAB node MT 502. The migrating IAB node MT 502 relays the uplink data to the target parent IAB node DU 505, which relays the uplink data to the target path IAB node DU 506, which relays the uplink data to the target IAB donor DU 507', which relates the uplink data to the IAB donor CU 508. The target path 582 includes the target IAB donor DU 507', the target path IAB node DU 506, and the target parent IAB node DU 505. The target parent IAB node DU 505 is the parent node of the migrating IAB node MT 502 after the HO.

Any parent nodes described herein refers to a node directly upstream from the migrating IAB node MT 502 in the source path 581 or the target path 582. While the inter-donor DU HO 500a shows two nodes in addition to the donor DU 507 or 507' in either the source path 581 or the target path 582, either the source path 581 or the target path 582 can include one (e.g., only the parent node) or three or more (e.g., multiple source path nodes or multiple target path nodes) IAB nodes in addition to the donor DU 507 or 507'.

Figure 5B:
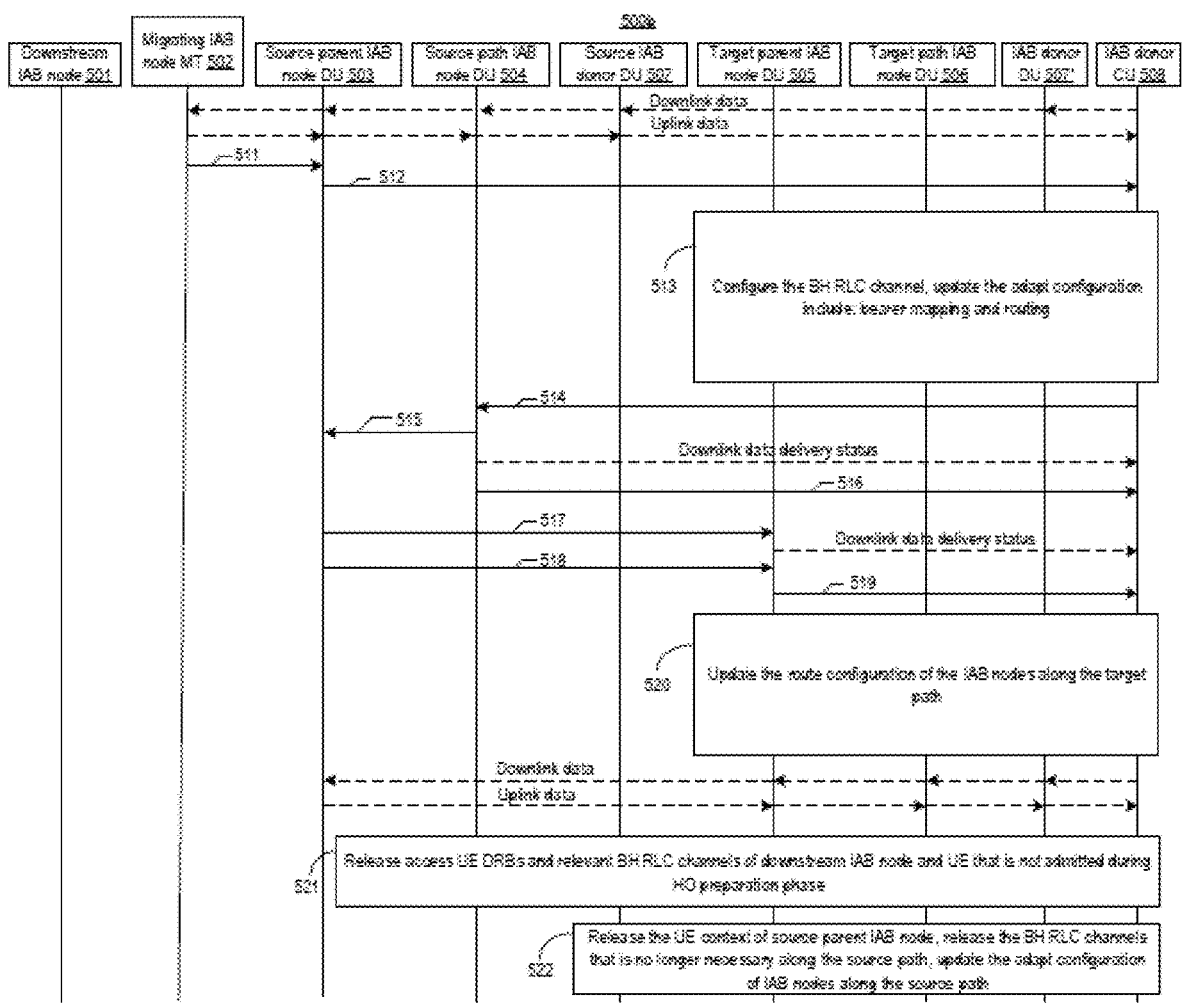
FIG. 5B illustrates a process flowchart diagram of an inter-donor DU HO method, in accordance with some embodiments of the present disclosure.

FIG. 5B illustrates a process flowchart diagram of an inter-donor DU HO method 500b, in accordance with some embodiments of the present disclosure. Referring to FIGS. 1-5B, the inter-donor DU HO method 500b is an inter-donor DU HO signaling procedure for the inter-donor DU HO 500a for the IAB node MT 502. In the inter-donor DU HO signaling procedure as depicted by FIG. 5B and as shown in FIG. 5A, the IAB DUs (e.g., 507 and 507') of the source path 581 and the target path 582 are different IAB nodes. The IAB donor CU 508 can, in the HO preparation phase, complete adapt configuration (e.g., bearer mapping and routing) and BH RLC channel configuration. In an example in which the IAB donor CU 508 serves as an agent for GTP-U tunnel or the IAB donor CU 508 executes GTP-U or GTP-C header packaging, the GTP-U tunnel or the F1AP ID information needs to be updated at the target IAB donor DU 507' as the inter-donor DU HO is performed.

The HO method 500b includes three phases: HO preparation, HO execution, and HO completion. The HO preparation phase includes operations/processes denoted as 511-513. The HO execution phase includes operations/processes denoted as 514-520. The HO completion phase includes operations/processes denoted as 521 and 522.

Before the HO preparation phase, downlink data is sent through the source path 581, e.g., from the IAB donor CU 508 to the source IAB donor DU 507, which relays the downlink data to the source path IAB node DU 504, which relays the downlink data to the source parent IAB node DU 503, which relays the downlink data to the migrating IAB node MT 502. Uplink data is sent through the source path 581, e.g., from the migrating IAB node MT 502 to the source parent IAB node DU 503, which relays the uplink data to the source path IAB node DU 504, which relays the uplink data to the IAB donor DU 507, which relays the uplink data to the IAB donor CU 508.

In the HO preparation phase, the migrating IAB node MT 502 sends a measurement report to the IAB donor CU 508. The measurement report is based on (e.g., derived from) a measurement configuration that the migrating IAB node MT 502 previously received from the IAB donor CU 508. For example, at 511, the migrating IAB node MT 502 sends the measurement report to the source parent IAB node DU 503, and the source parent IAB node DU 503 sends an uplink RRC transfer message to the IAB donor CU 508 to convey the received measurement report at 512 to. The IAB donor CU 508 determines whether to handover connection for the migrating IAB node MT 502 from the source nodes 503, 504, and 507 (e.g., from the source path 581) to the target nodes 505, 506, and 507' (e.g., to the target path 582). In response to determining that the connection for the migrating IAB node MT 502 is to be handed over from the source path 581 to the target path 582, HO preparations are made.

At 513, the IAB donor CU 508 configures the BH RLC channel, updates the adapt configuration. Updating the adapt configuration includes bearer mapping and routing. Before the HO execution is complete, the source IAB donor DU 507 is still needed for forwarding the HO-related signaling and UP packets. Thus, routing configuration is performed on the IAB nodes in the target path 482 that do not overlap with those in the source path 481. At 514, the IAB donor CU 508 sends a UE context modification request to the source parent IAB node DU 503. The UE context modification request includes at least a generated RRC reconfiguration message (e.g., an RRC connection reconfiguration message). The RRC reconfiguration message may indicate to stop data transmission for the migrating IAB node MT 502. At 515, the source parent IAB node DU 503 forwards the RRC reconfiguration message to the migrating IAB node MT 502. Then, the migrating IAB node MT 502 performs RRC reconfiguration (with synchronization). The source parent IAB node DU 503 may send a DDDS to the IAB donor CU 508. At 516, the source parent IAB node DU 503 sends a UE context modification response to the IAB donor CU 508. At 517, the migrating IAB node MT 502 performs a random access procedure at the target parent IAB node DU 505. The target parent IAB node DU 505 may send a DDDS to the IAB donor CU 408, in response to the random access procedure. At 518, the migrating IAB node MT 502 sends an RRC reconfiguration complete message to the target parent IAB node DU 505. At 519, the target parent IAB node DU 505 sends an uplink RRC transfer message to the IAB donor CU 508, to convey the RRC reconfiguration complete message. At this point, downlink packets are sent to the migrating IAB node MT 502. Uplink packets are sent from the migrating IAB node MT 502 and forwarded to the IAB donor CU 508 through the target parent IAB node DU 505.

At 520, the IAB donor CU 508 configures a new adaptation-layer route on the wireless backhaul between the migrating IAB node MT 502 and the IAB donor DU 507' via the target parent IAB node DU 505 in the target path 582. The route configuration needs to be performed for IAB nodes of the target path 582 that are overlapping with those IAB nodes in the source path 581. As described, the route configuration of the IAB nodes in the target path 582 that do not overlap with those IAB nodes in the source path 581 can be updated during HO preparation phase (e.g., at 513).

Following the HO execution phase from 514-520, downlink data is sent through the target path 582, e.g., the IAB donor CU 508 sends the downlink data to the IAB donor DU 507', which relays the downlink data to the target path IAB node DU 506, which relays the downlink data to the target parent IAB node DU 505, which relays the downlink data to the migrating IAB node MT 502. Uplink data can be sent through the target path 582, e.g., the migrating IAB node MT 502 can send the uplink data to the target parent IAB node DU 505, which relays the uplink data to the target path IAB node DU 506, which relays the uplink data to the IAB donor DU 507', which relates the uplink data to the IAB donor CU 508.

At 521, the IAB donor CU 508 releases UE DRBs and relevant BH RLC channels of downstream IAB node (e.g., the downstream IAB node 501) and UEs that have not been admitted during HO preparation phase. Any access UE DRB change can also trigger interaction with NGC for PDU session modification. At 522, the IAB donor CU 508 sends an UE context release command message to the source parent IAB node DU 503. The source parent IAB node DU 503 releases the MT context and the BH RLC channels that are no longer needed along the source path 581, updates the adapt configuration of IAB nodes along the source path 581 and responds the IAB donor CU 508 with an UE context release complete message.

Figure 6A:
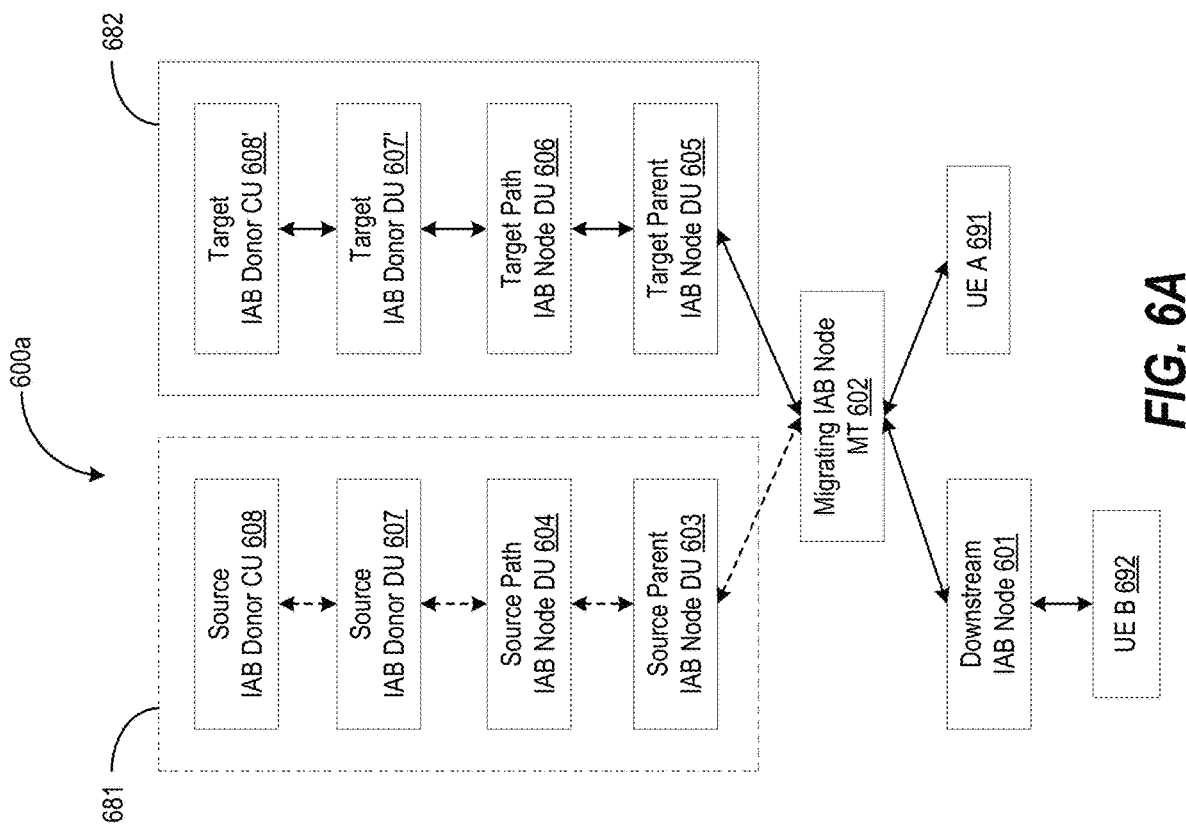
FIG. 6A illustrates a diagram depicting an inter-donor CU HO, in accordance with some embodiments of the present disclosure.

FIG. 6A illustrates a diagram depicting an inter-donor CU HO 600a, in accordance with some embodiments of the present disclosure. Referring to FIGS. 1-6, before the inter-donor CU HO 600a, data is communicated via a source path 681. For instance, downlink data is sent from an IAB donor CU 608 to a source IAB donor DU 607, which relays the downlink data to a source path IAB node DU 604, which relays the downlink data to a source parent IAB node DU 603, which relays the downlink data to a migrating IAB node MT 602. The migrating IAB node MT 602 can relay the downlink data to UE A 691, which is connected directly to the migrating IAB node MT 602 via an access link. The migrating IAB node MT 602 can relay the downlink data to a downstream IAB node 601, which relays the downlink data to UE B 692, which is connected directly to the downstream IAB node 601 via an access link. Uplink data is sent by the UE A 691 to the migrating IAB node MT 602 and by the UE B 692 to the downstream IAB node 601, which relays the uplink data to the migrating IAB node MT 602. The migrating IAB node MT 602 relays the uplink data to the source parent IAB node DU 603, which relays the uplink data to the source path IAB node DU 604, which relays the uplink data to the source IAB donor DU 607, which relays the uplink data to the IAB donor CU 608. The source path 681 includes the IAB donor CU 608, the source IAB donor DU 607, the source path IAB node DU 604, and the source parent IAB node DU 603. The source parent IAB node DU 603 is the parent node of the migrating IAB node MT 602, which has satisfied the threshold for triggering a HO (e.g., determined based on suitable measurement report described herein).

After the inter-donor CU HO 600a (e.g., after an HO execution phase is performed as described herein), data is communicated via a target path 682. For instance, downlink data is sent from an IAB donor CU 608' (different from the IAB donor CU 608) to a target IAB donor DU 607' (different from the source IAB donor DU 607), which relays the downlink data to a target path IAB node DU 606, which relays the downlink data to a target parent IAB node DU 605, which relays the downlink data to the migrating IAB node MT 602. The migrating IAB node MT 602 can relay the downlink data to the UE A 691. The migrating IAB node MT 602 can relay the downlink data to the downstream IAB node 601, which relays the downlink data to the UE B 692. Uplink data is sent by the UE A 691 to the migrating IAB node MT 602 and by the UE B 692 to the downstream IAB node 601, which relays the uplink data to the migrating IAB node MT 602. The migrating IAB node MT 602 relays the uplink data to the target parent IAB node DU 605, which relays the uplink data to the target path IAB node DU 606, which relays the uplink data to the target IAB donor DU 607', which relates the uplink data to the IAB donor CU 608'. The target path 682 includes the IAB donor CU 608', the target IAB donor DU 607', the target path IAB node DU 606, and the target parent IAB node DU 605. The target parent IAB node DU 605 is the parent node of the migrating IAB node MT 602 after the HO.

Any parent nodes described herein refers to a node directly upstream from the migrating IAB node MT 602 in the source path 681 or the target path 682. While the inter-donor CU HO 600a shows two nodes in addition to the donor DU 607 or 607' and the donor CUs 608 or 608' in either the source path 681 or the target path 682, either the source path 681 or the target path 682 can include one (e.g., only the parent node) or three or more (e.g., multiple source path nodes or multiple target path nodes) IAB nodes in addition to the donor DU 607 or 607' and the donor CUs 608 or 608'.

In the inter-donor CU HO 600a, the BH RLC channel update and reconfiguring the adapt configuration as described herein is performed. Furthermore, the source IAB donor CU 608 and the target IAB donor CU 608' interact to communicate context information for the migrating IAB node MT 602. In some examples, context information of any child IAB node (e.g., the downstream IAB node 601) of the migrating IAB node MT 602, as well as context information of any access UE (e.g., the UEs 691 and 692) served by the migrating IAB node MT 602 and its child IAB node are exchanged through the interaction of the source IAB donor CU 608 and the target IAB donor CU 608'. Through interacting with NGC, path switching is performed for the migrating IAB node MT 602, any child IAB node (e.g., the downstream IAB node 601) served by the migrating IAB node MT 602, any access UE (e.g., the UEs 691 and 692) served by the migrating IAB node MT 602 and its child IAB node. Given that the CU is switched, the context of the migrating IAB node MT 602 is considered, including performing F1 setup for any child IAB node (e.g., the downstream IAB node 601) of the migrating IAB node MT 602.

Figure 6B:
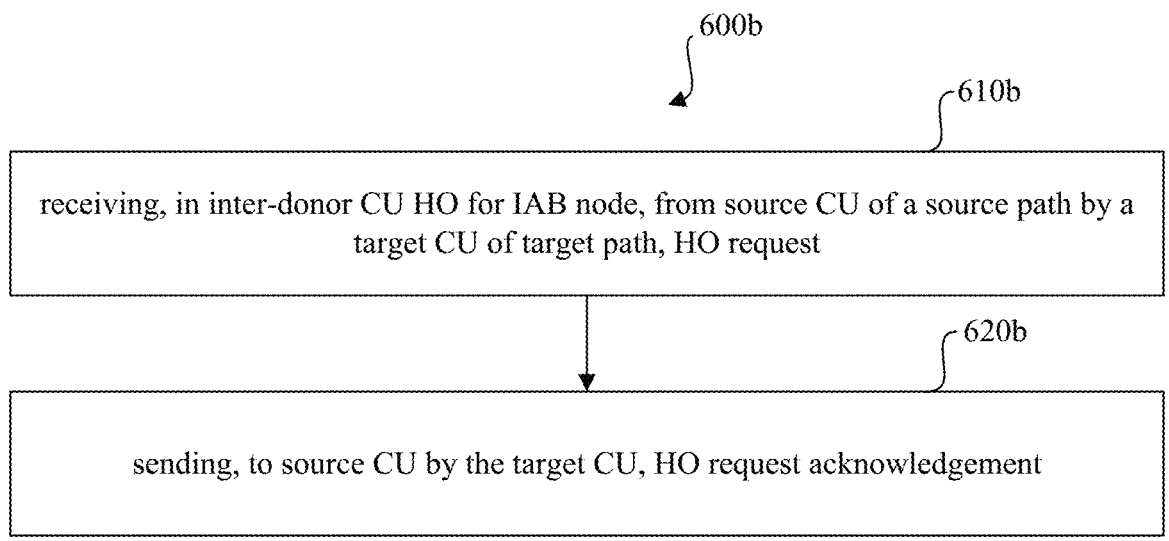
FIG. 6B illustrates a process flowchart diagram of an inter-donor CU HO method, in accordance with some embodiments of the present disclosure.

FIG. 6B illustrates a process flowchart diagram of an inter-donor CU HO method 600b, in accordance with some embodiments of the present disclosure. The inter-donor CU HO method 600b (for HO for a migrating IAB node) is similar to the intra-donor CU HO methods described herein, and further includes additional features.

For example, at 610b, a target CU of a target path receives a HO request (e.g., a HANDOVER REQUEST message) from a source CU of a source path. In some examples, the HO request includes a RLC to-be-setup list IE (e.g., a backhaul RLC to be setup list IE). If the RLC to-be-setup list IE is contained in the HO request, the target CU acts as specified in TS 38.401 [4]. The RLC to-be-setup list includes at least one of control signaling, user packet indication, a backhaul RLC channel level QoS profile, a UE bearer level QoS profile, a QoS flow-level QoS profile for user plane backhaul RLC channel, or a SRB QoS profile.

In some examples, the HO request includes an IAB indication IE based on which the target CU takes the HO node as an IAB node. In some examples, the HO request includes an adaption layer configuration IE, which the target CU takes into account for configuring an adaptation layer. In some examples, the HO request includes a route list IE (e.g., Routes to be AddModed List Item IE) which the target CU takes into account for configuring a route table. The route list IE includes at least a route identifier and a QoS identification list. In some examples, only data that is in the QoS identification list is transferred via routes corresponding to the route identifier.

At 620b, the target CU sends a HO request acknowledgement (e.g., a HANDOVER REQUEST ACKNOWLEDGE message) to the source CU.

In some examples, after the HO is completed, the target CU sends to an IAB node, a corresponding internet protocol (IP) address and sends to at least one downstream IAB node of the IAB node, a corresponding IP address. The IP address is sent to both (1) the migrating IAB node, and (2) downstream IAB nodes of the migrating IAB node.

In some examples, after the HO is completed, the target CU sends a RRC reconfiguration message to a MT of the migrating IAB node. In some examples, after the HO is completed, the target CU sends a RRC reconfiguration message to at least one downstream IAB node of the IAB node of the migrating IAB node. In some examples, a corresponding IP address is carried in RRC reconfiguration message.

Figure 6C:
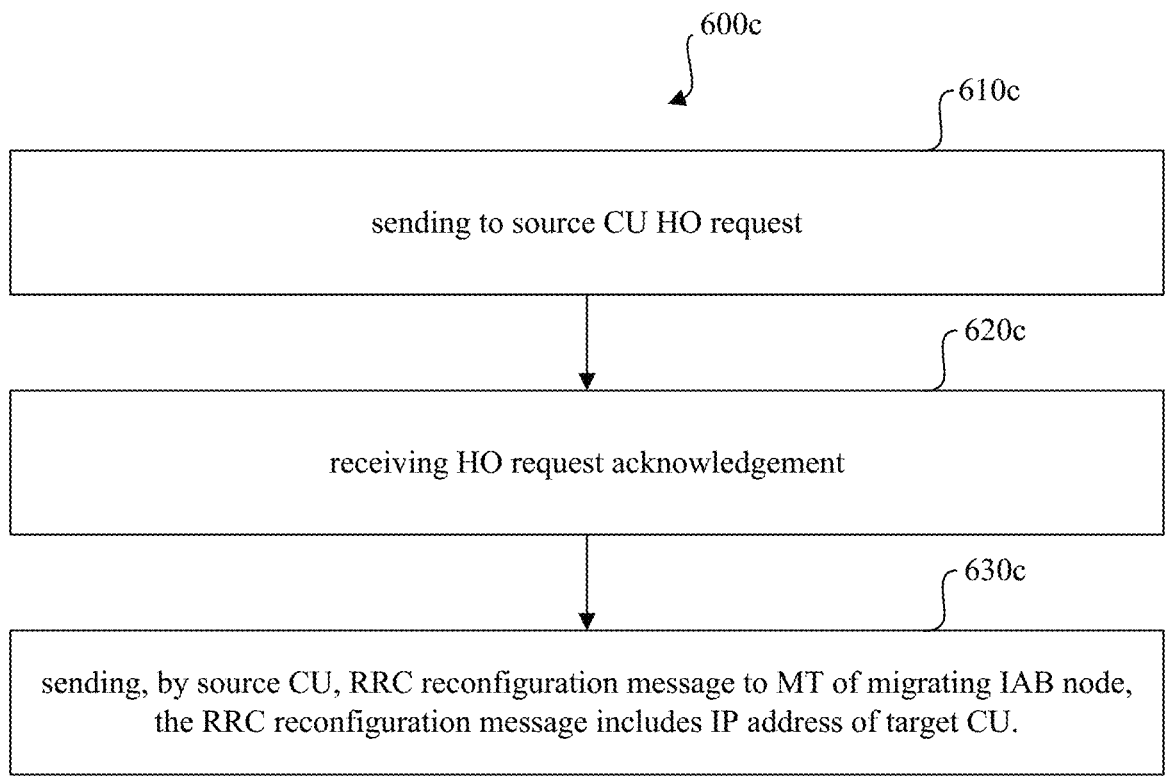
FIG. 6C illustrates a process flowchart diagram of an inter-donor CU HO method, in accordance with some embodiments of the present disclosure.

FIG. 6C illustrates a process flowchart diagram of an inter-donor CU HO method 600c, in accordance with some embodiments of the present disclosure. The inter-donor CU HO method 600c (for HO for a migrating IAB node) is similar to the intra-donor CU HO methods described herein, and further includes additional features.

At 610c, sending, to a source CU a HO request. At 620c, receiving a HO request acknowledgement. At 630c, sending, by the source CU, a RRC reconfiguration message to a MT of the IAB node, which comprises an IP address of the target CU.

Figure 6D:
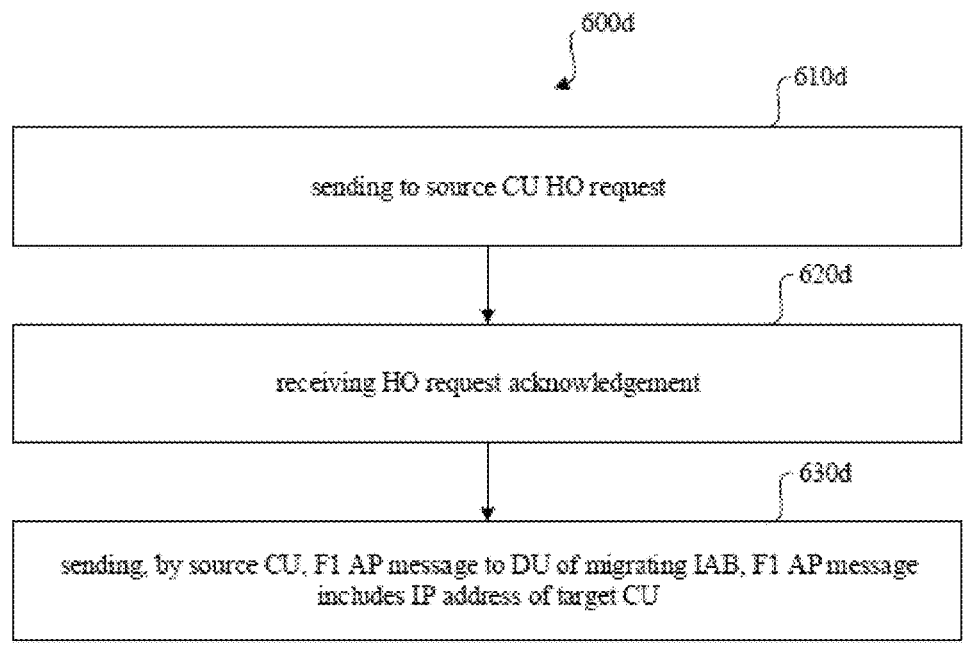
FIG. 6D illustrates a process flowchart diagram of an inter-donor CU HO method, in accordance with some embodiments of the present disclosure.

FIG. 6D illustrates a process flowchart diagram of an inter-donor CU HO method 600d, in accordance with some embodiments of the present disclosure. The inter-donor CU HO method 600d (for HO for a migrating IAB node) is similar to the intra-donor CU HO methods described herein, and further includes additional features.

610c, sending, to a source CU a HO request. At 620c, receiving a HO request acknowledgement. At 630c, sending, by the source CU, a F1 AP message to a DU of the IAB, which includes IP address of the target CU.

Figure 7:
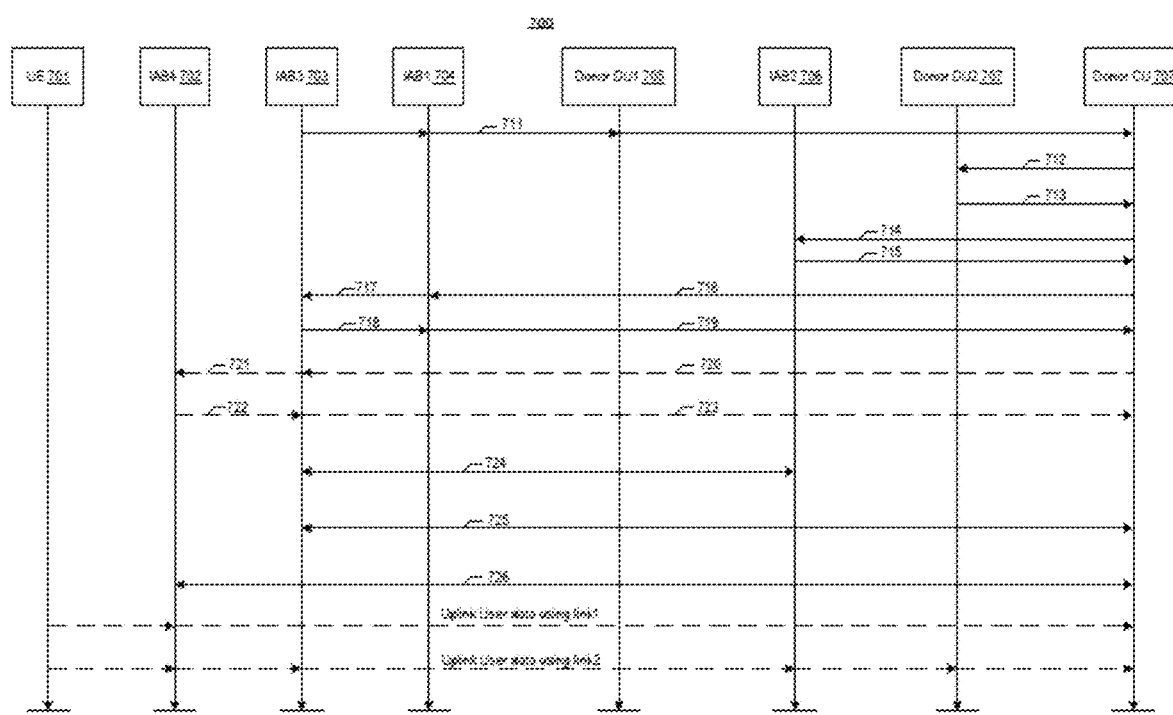
FIG. 7 illustrates a process flowchart diagram of a method for adding a secondary cell group (SCG), in accordance with some embodiments of the present disclosure.

FIG. 7 illustrates a process flowchart diagram of a method 700 for adding a SCG, in accordance with some embodiments of the present disclosure. Referring to FIGS. 1-7, IAB3 703 is connected to IAB1 704 via an access link, the donor CU 708 determines to add IAB2 706 as a SCG for IAB3 703 based on a measurement report.

For example, at 711, IAB3 703 sends the measurement report to IAB1 704, which relays the measurement report to a donor DU 705, and the donor DU 705 forward the measurement report to the donor CU 708. The donor CU 708 determines to add IAB2 706 as a SCG for IAB3 703 based on a measurement report. Responsive to determining to add IAB2 706 as a SCG for IAB3 703, the donor CU 708 exchanges a UE context information of IAB3 703 with the IAB2 706 and all IAB nodes upstream from the IAB2 706. For example, at 712, the donor CU 708 sends a UE context setup request to a donor DU 707, and the donor DU 707 sends a UE context setup response to the donor CU 708, at 713. At 714, the donor CU 708 sends a UE context setup request to the IAB2 706, and the IAB2 706 sends a UE context setup response to the donor CU 708, at 715. The UE context information of IAB3 703 exchanged at 712-715 include but is not limited to, IAB3 MT context information, BH RLC channel context information, UE downstream and upstream routing information of UEs, route table update information. For 1:1 mapping, UE context information of UEs for which forwarding data is needed is exchanged. For 1:N mapping, only IAB3 703 node context information (including context information of DRB SRB established by IAB MT3 and HV RLC channel context information) needs to be exchanged.

In response to the donor CU 708 negotiating with IAB3 703 (as well as its upstream IAB node), the donor CU 708 determines DRB and BH RLC channel configuration information and sends such information to the IAB3 703. For example, at 716, the via donor CU 708 sends the information via downlink RRC transfer to IAB1 704, which sends the information to the IAB3 703 via RRC connection reconfirmation at 717. At 718, the IAB3 703 sends an RRC reconfiguration complete message to the IAB1 704, which sends an uplink RRC transfer message to the donor CU 708.

In an example in which DRB for a downstream IAB node and UEs needs to be reconfigured, the donor CU 708 sends RRC reconfiguration messages to the downstream IAB node and the UEs, e.g., at 720-723. At 724, IAB3 703 performs a random access procedure, completing the SCG addition process. At 725, the donor CU 708 configures a new adaptation-layer route on the wireless BH between IAB3 703 and the donor CU 708. The donor CU 708 further configures a forwarding entry between a front haul and the new route on the wireless BH. IAB3 703 needs to update route table configurations. If route table of all upstream IAB nodes of the newly added SCG have not been updated previously, routing forwarding entry information is updated for all upstream IAB nodes of the newly added SCG. At 726, routing may or may not be configured for IAB4 702, which is a child node of IAB3 703.

Figure 8:
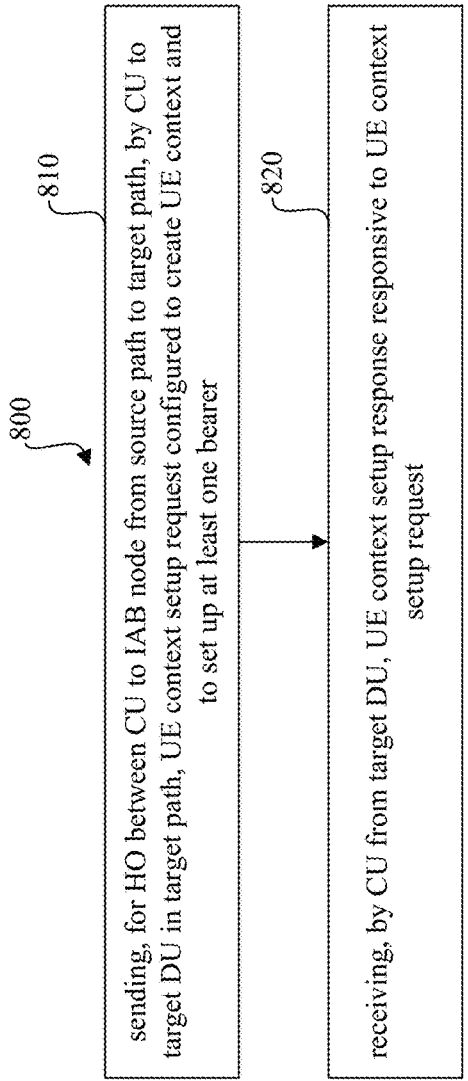
FIG. 8 illustrates a process flowchart diagram of an HO method, in accordance with some embodiments of the present disclosure.

FIG. 8 illustrates a process flowchart diagram of an HO method 800, in accordance with some embodiments of the present disclosure. Referring to FIGS. 1-8, at 810, a CU (e.g., a gNB CU) sends to a target DU (e.g., a gNB DU), a UE context setup request configured to create a UE context and to set up at least one bearer. In some examples, the UE context setup request comprises an RLC to-be-setup list information element (IE) (e.g., backhaul RLC to be setup list IE). The RLC to-be-setup list comprises at least one of control signaling, user packet indication, a backhaul RLC channel level QoS profile, a UE bearer level QoS profile, a QoS flow-level QoS profile for user plane backhaul RLC channel, or a SRB QoS profile. In some examples, the UE context setup request includes an adaption layer configuration IE based on which the target DU configures an adaptation layer. In some examples, the UE context setup request includes a route list IE (Routes to be AddModed List Item IE) based on which the target DU configures a route table. The route list IE includes at least a route identifier and a QoS identification list. In some examples, only data that is in the QoS identification list is transferred via routes corresponding to the route identifier. In some examples, the UE context setup request includes an IAB indication IE based on which the target DU receives the UE context setup request as an IAB node.

In some embodiments, the HO method 800 is an intra-CU HO. In this case, the target DU includes one or more of a target parent IAB DU, at least one upstream target IAB DU of the target parent IAB DU, and a target donor DU. Sending the UE context setup request includes sending, by the CU to the target parent IAB DU, a first UE context setup request, sending, by the CU to each of the upstream target IAB DU, a second UE context setup request, and sending, by the CU to the target donor DU, a third UE context setup request.

In some examples, the target DU is non-overlap with IAB nodes in a source path. The UE context setup request includes updated routing configuration. The updated routing configuration includes at least one of a route delete list (e.g., Routes to be Deleted List item) or a route add list (e.g., Routes to be AddModed List item).

In some examples, the target DU overlaps with IAB nodes in a source path. The UE context setup request is sent after the HO is completed. The UE context setup request includes updated routing configuration. The updated routing configuration includes at least one of a route delete list (e.g., Routes to be Deleted List item) or a route add list (e.g., Routes to be AddModed List item).

In some examples, the target DU overlaps with IAB nodes in the source path. Updated routing configuration (instead of the UE context setup request) is sent after the HO is completed. The updated routing configuration. includes at least one of a route delete list (e.g., Routes to be Deleted List item) or a route add list (e.g., Routes to be AddModed List item).

At 820, the CU receives from the target DU a UE context setup response responsive to the UE context setup request. In some examples, the UE context setup response is configured to report results for all requested backhaul RLC channel or bearer. In some examples, the UE context setup response includes at least a RLC setup list IE (e.g., backhaul RLC setup list IE) or a RLC setup failure list IE (backhaul RLC failed to setup list IE. The RLC setup list IE includes a list of backhaul RLC channels or bearers successfully established. A RLC setup failure list IE includes a list of backhaul RLC channels or bearers that have failed to be established.

Figure 9:
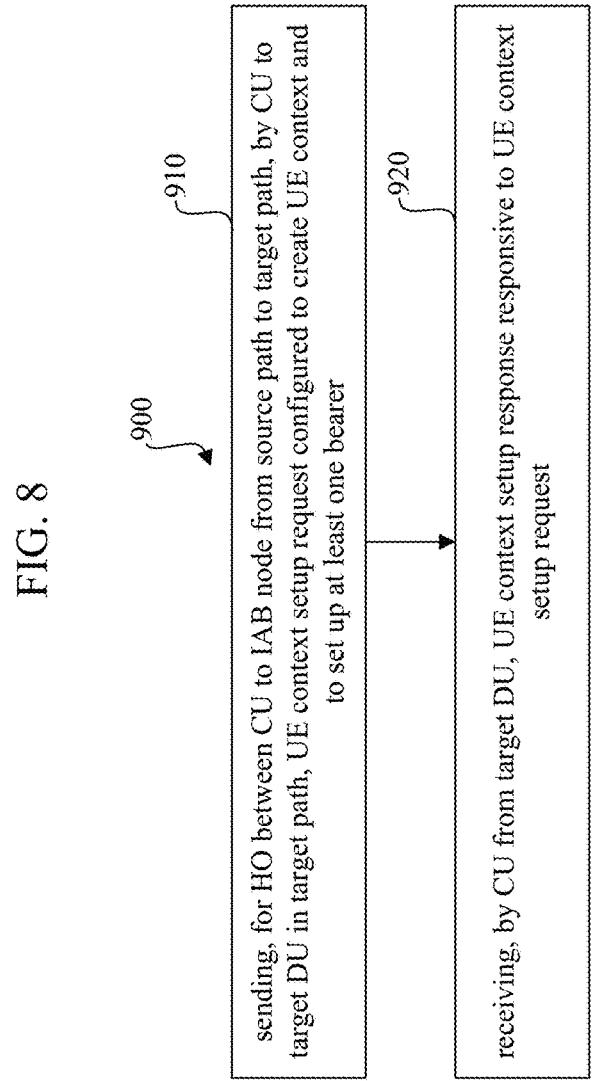
FIG. 9 illustrates a process flowchart diagram of an HO method, in accordance with some embodiments of the present disclosure.

FIG. 9 illustrates a process flowchart diagram of an HO method 900, in accordance with some embodiments of the present disclosure. Referring to FIGS. 1-9, at 910, a CU sends to a target DU and at least one target path DU, an IAB modification request (e.g., IAB backhaul modification request message). In some embodiments, the at least one target path DU includes all DUs in the target path. In some embodiments, the at least one DU includes DUs in the target path that overlap with at least one DU in the source path.

In some examples, the IAB modification request includes a route list IE (e.g., Routes to be AddModed List Item IE) based on which the target DU configures a route table.

At 920, the CU receives from the target DU at the at least one target path DU, an IAB modification response (e.g., IAB backhaul modification RESPONSE message).

In some examples, the migrating IAB node is configured to change a destination address of a source path in an adaptation layer of transmitted (uplink) data to a destination address of a target path. In some examples, the migrating IAB node is configured to change a route identifier of a source path in an adaptation layer of transmitted (uplink) data to a route identifier of a target path.

In some embodiments, in response to the IAB node receiving routing information updates, the CU receives from a source DU of the migrating IAB node, a data delivery status (e.g., DDDS) which informs the CU about data unsuccessfully transmitted to a wireless communication device or the migrating IAB node.

In some examples, the CU sends the routing information update after or in response to sending a UE context modification request message to a source DU. In some examples, the CU sends the routing information update after or in response to receiving RRC reconfiguration complete message.

In some examples, in response to the CU determining that the HO is needed for the IAB node, the CU sends routing information update to all downstream IAB nodes of the migrating IAB node, wherein a RRC reconfiguration message or an F1 (AP) message includes the routing information update.

In some examples, a routing information update indication includes at least one IAB node identifier configured to identify at least one IAB node in the target path. In some examples, a routing information update indication includes a HO type, and the HO type is one of an inter-CU HO, an intra-CU HO, or an intra-DU HO.

Figure 10:
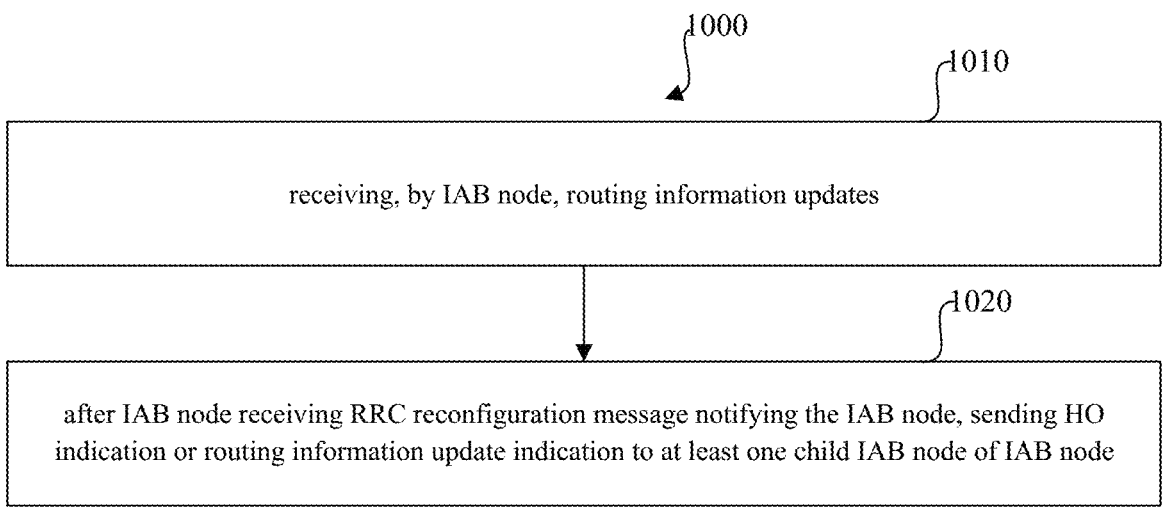
FIG. 10 illustrates a process flowchart diagram of an HO method, in accordance with some embodiments of the present disclosure.

FIG. 10 illustrates a process flowchart diagram of an HO method 1000, in accordance with some embodiments of the present disclosure. Referring to FIGS. 1-10, at 1010, a migrating IAB node receives routing information updates.

At 1020, after or in response to the migrating IAB node receiving a RRC reconfiguration message notifying the migrating IAB node, sending a HO indication or routing information update indication to at least one or all of the child (downstream) IAB nodes of the migrating IAB node. In some examples, the HO indication includes at least one IAB node identifier configured to identify at least one IAB node in the target path. In some examples, the HO indication includes a HO type, and the HO type is one of an inter-CU HO, an intra-CU HO, or an intra-DU HO.

Figure 11:
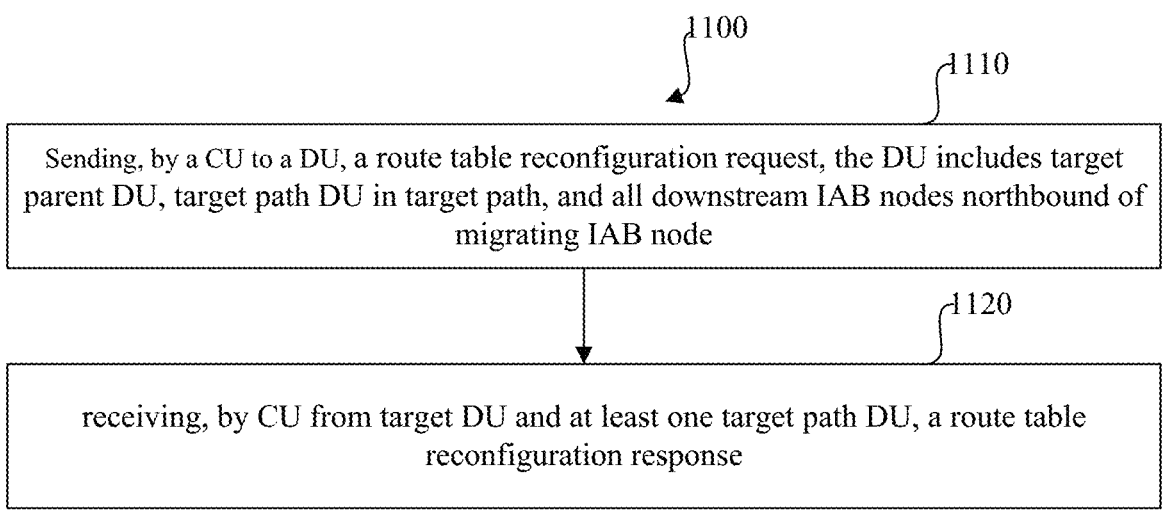
FIG. 11 illustrates a process flowchart diagram of an HO method, in accordance with some embodiments of the present disclosure.

FIG. 11 illustrates a process flowchart diagram of an HO method 1100, in accordance with some embodiments of the present disclosure. Referring to FIGS. 1-11, at 1110, a CU sends to a DU a route table reconfiguration request (e.g., route-table-reconfiguration Request). The DU includes a target parent DU, a target path DU in the target path, and all downstream IAB nodes of the migrating IAB node. The target path DU may include all DUs in the target path or all DUs in the target path that overlaps with at least one DU in the source path.

At 1120, the CU receives from the target DU and the at least one target path DU, a route table reconfiguration response (e.g., a route-table-reconfiguration RESPONSE message).

Figure 12:
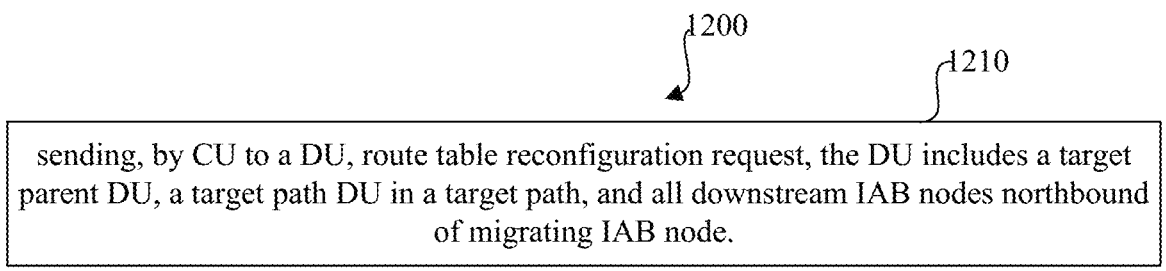
FIG. 12 illustrates a process flowchart diagram of an HO method, in accordance with some embodiments of the present disclosure.

FIG. 12 illustrates a process flowchart diagram of an HO method 1200, in accordance with some embodiments of the present disclosure. Referring to FIGS. 1-12, at 1210, a CU sends to a DU a route table reconfiguration request (e.g., route-table-reconfiguration Request). The DU includes a target parent DU, a target path DU in the target path, and all downstream IAB nodes of the migrating IAB node. The target path DU may include all DUs in the target path or all DUs in the target path that overlaps with at least one DU in the source path. The method 1200 different from the method 1100 in that in the method 1200, the CU directly sends the route table reconfiguration request without needing feedback from the DU (e.g., without needing 1120).

Figure 13:
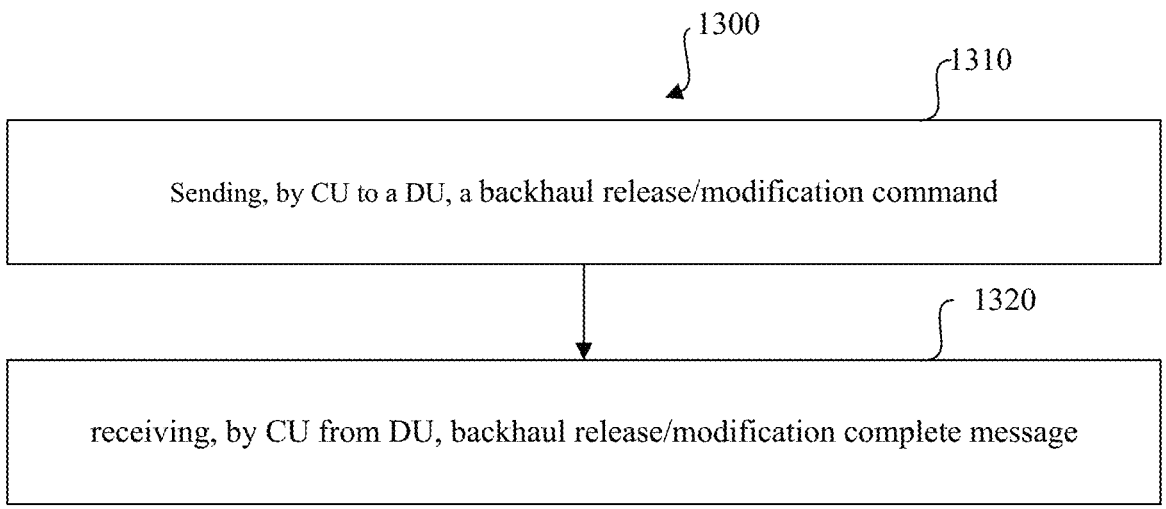
FIG. 13 illustrates a process flowchart diagram of an HO method, in accordance with some embodiments of the present disclosure.

FIG. 13 illustrates a process flowchart diagram of an HO method 1300, in accordance with some embodiments of the present disclosure. Referring to FIGS. 1-13, at 1310, the CU sends to a DU a backhaul release/modification command (e.g., a backhaul release command or a backhaul modification command). In some examples, the DU includes a plurality of source DUs in the source path, such that the CU sends the backhaul release/modification command to the plurality of source DUs.

In some embodiments, the backhaul release/modification command includes backhaul release information. The backhaul release information includes at least one of a backhaul RLC channel release message or a route delete list (e.g., Routes to be Deleted List IE).

In some embodiments, the backhaul release/modification command is a backhaul modification command. The backhaul modification command includes at least one of a backhaul RLC channel modification message or an adapt configuration update message.

In some embodiments, the backhaul release/modification command further includes a DRB list.

In some embodiments, responsive to the CU sending the backhaul release/modification command, the CU sends to the migrating IAB node, at least one of an adapt configuration update, a backhaul RLC channel modification message, or a route delete list.

In some embodiments, responsive to the CU sending the backhaul release/modification command, the CU sends to a downstream IAB node of the IAB node, at least one of an adapt configuration update, a backhaul RLC channel modification message, or a route delete list.

At 1320, the CU receives from the DU, a backhaul release/modification complete message (e.g., a backhaul release complete message or a backhaul modification complete message).

Figure 14:
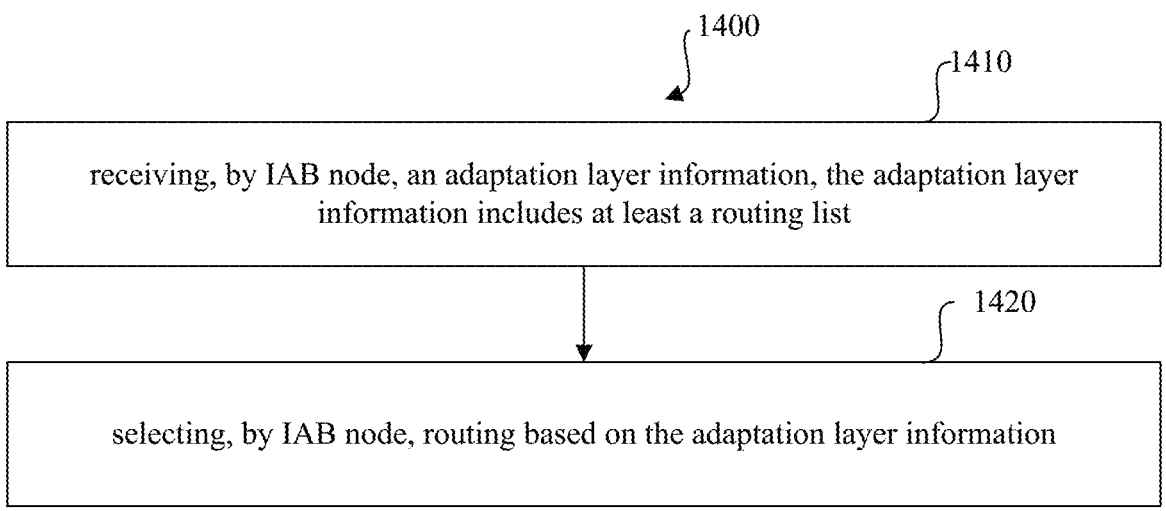
FIG. 14 illustrates a process flowchart diagram of an HO method, in accordance with some embodiments of the present disclosure.

FIG. 14 illustrates a process flowchart diagram of an HO method 1400, in accordance with some embodiments of the present disclosure. Referring to FIGS. 1-14, the HO method 1400 pertains to a multi-link scenario. In the multi-link scenario, if multiple entries that correspond to a given destination exist in a routing table configured for an intermediate IAB node, and the BH RLC channel between the next hop node and the intermediate IAB node indicated by such entries can support data transmission corresponding to the data packets, then simultaneously active redundancy links exist. As such, in selecting a next hop node for data transfer, several approaches may exist.

In one approach, the next hope node can be selected randomly or pseudo-randomly.

In another approach, the IAB donor CU selects a cost value for each routing entry (the cost value is determined per destination routing entry). The cost value can be can further determined based on different priority levels, different differentiated service code points (DSCP)s, different 5G QoS Indicators (5Qis), different UE bearers, and so on. In some examples, the hop node with the least cost value is selected.

In yet another approach, in the routing table configured by the IAB donor CU, if there are multiple routing entries (for a given destination) correspond to different next hop nodes, the IAB donor CU further configures at least one routing entry to used as a primary path and at least one routing entry to be used as a secondary path. The secondary path is selected responsive to determining that the primary path is unavailable (e.g., due to RLF).

In yet another approach, the QoS identifier of the data packet is determined based on a QoS list in the routing table. Responsive to determining that the QoS list corresponding to the routing identifier contains the QoS identifier of the data packet, the data packet can be transmitted using the route corresponding to the routing identifier; otherwise, the routing cannot be used.

In that regard, at 1410, an IAB node receives an adaptation layer information. The adaptation layer information includes at least a routing list. At 1402, the IAB node selects routing based on the adaptation layer information.

In some examples, the adaptation layer information further includes at least one of a data split threshold (e.g., DataSplitThreshold) or a reference signal received power (RSRP) threshold.

In some examples, in response to determining that data volume pending for transmission is equal to or larger than the data split threshold, the IAB node indicates data corresponding to the data volume to both a primary path or a secondary path. In some examples, in response to determining that data volume pending for transmission is less than the data split threshold, the IAB node indicates data corresponding to the data volume to a primary path.

In some examples, in response to determining that link quality of a primary path is less than the RSRP threshold or in response to determining/detecting a RLF, the IAB node indicates data to a secondary path.

In some examples, the routing corresponds to a routing configuration table. The routing configuration table includes at least a route identifier, a QoS identification list, a primary path identifier, or a secondary path identifier. In some examples, only data packets that are in the QoS identification list is transferred via routes corresponding to the route identifier.

The methods described herein are applicable to both CU-DU-separated structure and CU-DU-combined architecture. For the CU-DU-combined structure, the DU in the methods described herein includes an IAB node with both DU and CU functionalities, where the donor CU is an IAD donor.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
    sending, by a central unit (CU) to a target distributed unit (DU), a user equipment (UE) context setup request configured to cause the target DU to create a UE context and to set up at least one bearer for a handover preparation procedure, wherein the UE context setup request comprises a radio link control (RLC) to-be-setup list, including a backhaul RLC channel level quality-of-service (QOS) profile, a UE bearer level QoS profile, a QoS flow-level QoS profile for user plane backhaul RLC channel, or a signaling radio bearer (SRB) QoS profile;
    receiving, by the CU from the target DU, a UE context setup response in the handover preparation procedure, responsive to the UE context setup request, wherein the UE context setup response includes results for the at least one bearer set up by the target DU, wherein the results for the at least one bearer set up by the target DU include a RLC setup failure list, wherein the RLC setup failure list includes a list of backhaul RLC channels; and determining, by the CU, whether to modify configurations corresponding to the target DU to support the RLC channel to-be-setup list according to the UE context setup response.

2. The method of claim 1, wherein the UE context setup request comprises a RLC to-be-setup list information element (IE).

3. The method of claim 1, wherein the UE context setup request comprises a route list information element (IE) for use in configuring a route table.

4. The method of claim 3, wherein the route list IE comprises at least a route identifier and a QoS identification list.

5. The method of claim 4, wherein only data that is in the QoS identification list is transferred via routes corresponding to the route identifier.

6. A central unit (CU), comprising:
at least one processor configured to:
send, via a transceiver to a target distributed unit (DU), a user equipment (UE) context setup request configured to cause the target DU to create a UE context and to set up at least one bearer for a handover preparation procedure, wherein the UE context setup request comprises a radio link control (RLC) to-be-setup list, including a backhaul RLC channel level quality-of-service (QOS) profile, a UE bearer level QoS profile, a QoS flow-level QoS profile for user plane backhaul RLC channel, or a signaling radio bearer, SRB, QoS profile;

receive, via the transceiver from the target DU, a UE context setup response in the handover preparation procedure responsive to the UE context setup request, wherein the UE context setup response includes results for the at least one bearer set up by the target DU, wherein the results for the at least one bearer set up by the target DU include a RLC setup failure list, wherein the RLC setup failure list includes a list of backhaul RLC channels; and determine whether to modify configurations corresponding to the target DU to support the RLC channel to-be-setup list according to the UE context setup response.

7. The CU of claim 6, wherein the UE context setup request comprises at least one of: a RLC to-be-setup list information element (IE), or a route list information element (IE) for use in configuring a route table.

8. The CU of claim 7, wherein the route list IE comprises at least a route identifier and a QoS identification list.

9. The CU of claim 8, wherein only data that is in the QoS identification list is transferred via routes corresponding to the route identifier.

10. A non-transitory computer readable medium storing instructions, which when executed by at least one processor of a central unit (CU), cause the at least one processor to:
send, via a transceiver to a target distributed unit (DU) a user equipment (UE) context setup request configured to cause the target DU to create a UE context and to set up at least one bearer for a handover preparation procedure, wherein the UE context setup request comprises a radio link control (RLC) to-be-setup list, including a backhaul RLC channel level quality-of-service (QOS) profile, a UE bearer level QoS profile, a QoS flow-level QoS profile for user plane backhaul RLC channel, or a signaling radio bearer (SRB) QoS profile;

receive, via the transceiver from the target DU, a UE context setup response in the handover preparation procedure responsive to the UE context setup request, wherein the UE context setup response includes results for the at least one bearer set up by the target DU, wherein the results for the at least one bearer set up by the target DU include a RLC setup failure list, wherein the RLC setup failure list includes a list of backhaul RLC channels; and determine, by the CU, whether to modify configurations corresponding to the target DU to support the RLC channel to-be-setup list according to the UE context setup response.

11. The non-transitory computer readable medium of claim 10, wherein the UE context setup request comprises a RLC to-be-setup list information element (IE).

12. The non-transitory computer readable medium of claim 10, wherein the UE context setup request comprises a route list information element (IE) for use in configuring a route table.

13. The non-transitory computer readable medium of claim 12, wherein the route list IE comprises at least a route identifier and a QoS identification list.

* * * * *